(12) United States Patent
Kim et al.

(10) Patent No.: US 11,192,241 B2
(45) Date of Patent: Dec. 7, 2021

(54) VARIABLE GRAVITATIONAL TORQUE COMPENSATION APPARATUS AND CONTROL METHOD THEREFOR

(71) Applicant: KOREA INSTITUTE OF MACHINERY & MATERIALS, Daejeon (KR)

(72) Inventors: Hwi-su Kim, Daejeon (KR); Young-su Son, Daejeon (KR); Chan-hun Park, Daejeon (KR); Dong-il Park, Daejeon (KR); Hyun-min Do, Daejeon (KR); Tae-yong Choi, Daejeon (KR); Doo-hyeong Kim, Sejong (KR); Jin-ho Kyung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 406 days.

(21) Appl. No.: 16/082,254

(22) PCT Filed: Mar. 3, 2017

(86) PCT No.: PCT/KR2017/002317
§ 371 (c)(1),
(2) Date: Sep. 4, 2018

(87) PCT Pub. No.: WO2017/150933
PCT Pub. Date: Sep. 8, 2017

(65) Prior Publication Data
US 2019/0022853 A1    Jan. 24, 2019

(30) Foreign Application Priority Data

Mar. 4, 2016 (KR) .......... 10-2016-0026117
Apr. 5, 2016 (KR) .......... 10-2016-0041633

(51) Int. Cl.
*B25J 9/12* (2006.01)
*B25J 19/00* (2006.01)
(Continued)

(52) U.S. Cl.
CPC ............ *B25J 9/12* (2013.01); *B25J 9/1602* (2013.01); *B25J 18/04* (2013.01); *B25J 19/0016* (2013.01); *B25J 19/02* (2013.01); *B25J 13/085* (2013.01)

(58) Field of Classification Search
CPC ....... B25J 18/00; B25J 18/002; B25J 19/0016
See application file for complete search history.

(56) References Cited

U.S. PATENT DOCUMENTS 4,784,010 A * 11/1988 Wood ............... B25J 9/046
                                              16/401
6,123,649 A * 9/2000 Lee ............... A63B 21/153
                                              482/51
(Continued)

FOREIGN PATENT DOCUMENTS

JP    06-170780 A    6/1994
JP    2003-181789 A  7/2003
(Continued)

OTHER PUBLICATIONS

International Search Report for PCT/KR2017/002317 dated Jun. 15, 2017, citing the above reference(s).

*Primary Examiner* — Richard W Ridley
*Assistant Examiner* — Brian J McGovern
(74) *Attorney, Agent, or Firm* — Hauptman Ham, LLP

(57) ABSTRACT

In an apparatus for adjustable counterbalance mechanism and a method for controlling the apparatus, the apparatus includes a reference surface, a link, an elastic member, a wire, an idle roller and a compensation torque. The link has a first end rotationally connected to the reference surface to form a rotational center, and a weight center of the link is spaced apart from the rotational center. The elastic member has a first end combined with the link. The wire has a first side combined with a second end of the elastic member, and a second side combined with the reference surface. The idle roller is combined with the link to support a portion between first and second ends of the wire. The compensation torque (Continued)

controller is equipped to the link, to control the position of the idle roller and an elastic force of the elastic member.

9 Claims, 23 Drawing Sheets

(51) Int. Cl.
    *B25J 18/04*     (2006.01)
    *B25J 19/02*     (2006.01)
    *B25J 9/16*     (2006.01)
    *B25J 13/08*     (2006.01)

(56) References Cited

U.S. PATENT DOCUMENTS

| | | | |
|---|---|---|---|
| 6,378,446 B1 * | 4/2002 | Long | A47B 9/02 108/147 |
| 2008/0287268 A1 * | 11/2008 | Hidler | A61H 3/008 482/69 |
| 2013/0180353 A1 * | 7/2013 | Kang | B25J 19/0016 74/490.04 |
| 2014/0109803 A1 * | 4/2014 | Sweere | B66D 1/36 108/147 |
| 2014/0202276 A1 * | 7/2014 | Song | B25J 19/002 74/490.05 |
| 2015/0000453 A1 * | 1/2015 | Oda | B25J 18/02 74/490.01 |
| 2016/0259228 A1 * | 9/2016 | Hellsten | G02B 7/002 |

FOREIGN PATENT DOCUMENTS

| | | |
|---|---|---|
| KR | 10-0864607 B1 | 10/2008 |
| KR | 10-1304330 B1 | 9/2013 |
| KR | 10-1332694 B1 | 11/2013 |
| KR | 10-2015-0047090 A | 5/2015 |

* cited by examiner

VARIABLE GRAVITATIONAL TORQUE COMPENSATION APPARATUS AND CONTROL METHOD THEREFOR

CROSS REFERENCE TO RELATED APPLICATION

This present application is a national stage filing under 35 U.S.C § 371 of PCT application number PCT/KR2017/002317 filed on Mar. 3, 2017 which is based upon and claims the benefit of priority to Korean Patent Application Nos. 10-2016-0026117 and 10-2016-0041633 filed on Mar. 4, 2016 and Apr. 5, 2016 respectively in the Korean Intellectual Property Office. The disclosures of the above-listed applications are hereby incorporated by reference herein in their entirety.

BACKGROUND

1. Field of Disclosure

The present disclosure of invention relates to an apparatus for adjustable counterbalance mechanism and a method for controlling the apparatus, and more specifically the present disclosure of invention relates to an apparatus for adjustable counterbalance mechanism and a method for controlling the apparatus, in which a compensation torque may be changed to compensate both a tare weight of a robot and a pay load of a robot varying as the robot grips are compensated, a proper compensation torque may be provided to each joint of the robot via measuring a rotating angle of a fixing surface of the robot or a ground surface to control a reference surface even though an angle of the fixing surface or the ground surface is rotated, a quantity of an actuator driving the robot is minimized to be adjustable to a change of 2-axis ground angle.

As a cooperation between a human being and a robot is increased, various kinds of cooperative robots are developed. However, the developed robots may not be easily used for a conventional industrial robot, because a possibility of an impact between the human being and the robot is relatively high. Compared to the conventional industrial robot operated remoted from the human being, the cooperative robot operated with the human being should guarantee the safety. To guarantee the safety, various kinds of impact expectation, impact sensing, impact protection method, and so on have been developed, but the human being may be damaged more than expected, since the robot includes a high quantity of motor and reduction gear to provide a sufficient torque for the operation. In addition, when the quantity of motor and reduction gear is decreased, the torque may not be sufficient for the operation. Thus, until now, the safety of the cooperative robot is not fully guaranteed and is not fundamentally solved, and to increase an industrial environment of the cooperative robot with the human being, it is necessary to maintain the capacity and the power of the robot and to decrease the quantity of the motor and the reduction gear for the safety.

An adjustable counterbalance mechanism to decrease the quantity of the motor and the reduction gear, compensates a gravity torque generated due to a tare weight of a robot joint, and thus the torque for the operation may be minimized.

Related prior arts, Japanese Laid-open patent No. 2003-181789 discloses a mechanical tare weight compensation apparatus. In the apparatus, as illustrated in FIG. 1, a link 2 is combined with and is rotated with respect to an main axis 1. A first end of a spring element 3 is connected to a wire 4 and the wire 4 is fixed to an upper side of the main axis 1, and a second end of the spring element 3 is fixed to the link. The wire 4 is combined to pass through pulleys 5 combined with the link 2, and thus the compensation torque with respect to the tare weight of the rotation of the link 2.

However, the apparatus mentioned above, merely compensates the tare weight of a predetermined weight of link (or a robot arm), and thus as the weight of the link or the distance between a rotational center of the link and a weight center of the link is changed, or as a pay load applied to the link is changed, the proper compensation may not be performed. Here, to generate the proper compensation torque to meet the change of the weight, the spring element should be changed, which is very inconvenient method.

In addition, when the robot arm is mounted on a mobile platform for moving or the robot arm is mounted on a human type robot for a position of a waist to be changed, a pitch angle and a yaw angle of a mounting surface on which the robot arm is mounted are changed, and thus the compensation torque required for each joint with respect to the gravity is changed. However, conventionally, the compensation torque may be properly controlled to compensate both of the pitch angle and the yaw angle of the mounting surface.

2. Description of Related Technology

The present invention is developed to solve the above-mentioned problems of the related arts. The present invention provides an apparatus for adjustable counterbalance mechanism capable of compensating both a tare weight of a robot and a pay load of a robot varying as the robot grips are compensated, capable of easily changing the compensation torque, and capable of generating a proper compensation torque for the tare weight and the pay load.

In addition, the present invention also provides a method for controlling the apparatus.

In addition, the present invention also provides an apparatus for adjustable counterbalance mechanism capable of controlling a reference surface via measuring a rotational angle of a robot mounting surface or a robot base, such that the proper compensation torque may be provided to each joint and a quantity of an actuator driving the robot may be minimized to be adjustable to a change of 2-axis ground angle, even though an angle of the fixing surface or the ground surface is rotated.

SUMMARY

The present invention is developed to solve the above-mentioned problems of the related arts. According to an example embodiment, the apparatus for adjustable counterbalance mechanism includes a reference surface, a link, an elastic member, a wire, an idle roller and a compensation torque. The link has a first end rotationally connected to the reference surface to form a rotational center, and a weight center of the link is spaced apart from the rotational center. The elastic member has a first end combined with the link. The wire has a first side combined with a second end of the elastic member, and a second side combined with the reference surface. The idle roller is combined with the link to support a portion between first and second ends of the wire. The compensation torque controller is equipped to the link, to control the position of the idle roller and an elastic force of the elastic member.

In an example, the elastic member may be a coil spring arranged along a longitudinal direction of the link, and the elastic force may be controlled according to an initial compressive distance of the coil spring.

In an example, the apparatus may further include a spring fixed surface combined with the link to move and be fixed along the longitudinal direction of the link, and the first end of the elastic member may be supported by the spring fixed surface. The idle roller may be combined with the link, and move and be fixed along the longitudinal direction of the link.

In an example, the apparatus may further include a sliding block combined with the link to move and be fixed along the longitudinal direction of the link. The spring fixed surface may be combined and fixed with the sliding block, and the idle roller may be combined and fixed with the sliding block.

In an example, the apparatus may further include a lead screw screw-combined with the sliding block. A first side or both sides of the lead screw may be rotationally combined with the link.

In an example, at least two lead screws may be combined along a direction perpendicular to the longitudinal direction of the link.

In an example, the apparatus may further include a driving motor fixed to the link and connected to the lead screw, to rotate the lead screw.

In an example, the apparatus may further include a weight measuring sensor attached to the link.

According to the present example embodiments, in a method for controlling an apparatus for adjustable counterbalance mechanism, the apparatus includes a reference surface, a link, an elastic member (a coil spring), a wire, an idle roller and a compensation torque controller. The link has a first end rotationally connected to the reference surface to form a rotational center. A weight center of the link is spaced apart from the rotational center. The elastic member has a first end combined with the link. The wire has a first side combined with a second end of the elastic member and a second side combined with the reference surface. The idle roller is combined with the link to support a portion between first and second ends of the wire. The compensation torque controller is equipped to the link, to control the position of the idle roller and an elastic force of the elastic member. In the method, as a weight applied to a second end of the link increases, an initial compressive distance of the coil spring and a distance from the rotational center to the wire increase. As the weight applied to the second end of the link decreases, the initial compressive distance of the coil spring and the distance from the rotational center to the wire decrease.

In an example, as the weight applied to the second end of the link changes, the initial compressive distance of the coil spring and the distance from the rotational center to the wire may increase or decrease by the same distance.

In an example, the weight applied to the second end of the link may be measured to control the compensation torque automatically or manually.

According to the present example embodiments, an apparatus for adjustable counterbalance mechanism includes 1-1 and 1-2 counterbalance apparatuses, a 2-1 reference surface and a 2-2 reference surface, a 1-1 reference surface controller, and a 1-2 reference surface controller. A first link is rotationally connected to a first end of a second link to form a second joint which is a pitch direction rotational axis parallel with a ground surface. A weight center of the second link is spaced apart from the second joint. First ends of the 1-1 and 1-2 counterbalance apparatuses are connected to the second joint and second ends of the 1-1 and 1-2 counterbalance apparatuses are combined with the second link so that a compensation torque for a tare weight of the second link is generated when the second link is rotated with respect to the second joint. The 2-1 reference surface and the 2-2 reference surface are disposed to be aligned with a rotational axis of the second joint, and rotated with respect to a rotational axis of the second joint. The first end of the 1-1 counterbalance apparatus is connected to the 2-1 reference surface. The first end of the 1-2 counterbalance apparatus is connected to the 2-2 reference surface. A 1-1 reference surface controller is combined with the first link, and connected to the 2-1 reference surface to control and fix a rotational angle of the 2-1 reference surface. A 1-2 reference surface controller is combined with the first link, and connected to the 2-2 reference surface to control and fix a rotational angle of the 2-2 reference surface. The rotational angles of the 2-1 reference surface and the 2-2 reference surface are independently controlled.

In an example, the first link may be rotationally connected to a base to form a first joint which is a yaw direction rotational axis parallel with the ground surface. The 1-1 reference surface controller may include a 1-1 reference surface disposed to be aligned with the rotational axis of the first joint, rotated with respect to the rotational axis of the first joint, and connected with the 2-1 reference surface, and a 1-1 reference surface control motor connected to the 1-1 reference surface and fixed with the base, to control and fix the rotational angle of the 1-1 reference surface. The 1-2 reference surface controller may include a 1-2 reference surface disposed to be aligned with the rotational axis of the first joint, rotated with respect to the rotational axis of the first joint, and connected with the 2-2 reference surface, and a 1-2 reference surface control motor connected to the 1-2 reference surface and fixed with the base, to control and fix the rotational angle of the 1-2 reference surface.

In an example, the apparatus may further include a gradient sensor equipped to the first link or a base, to measure a rotational angle (gradient) of the first link or the base with respect to the pitch direction and the yaw direction.

In an example, the apparatus may further include a main controller connected to the 1-1 reference surface controller, the 1-2 reference surface controller and a gradient sensor, to control the rotational angle of the 2-1 reference surface and the rotational angle of 2-2 reference surface automatically, via the 1-1 reference controller and the 1-2 reference controller according to the gradient of the first link or the base measured by the gradient sensor.

In an example, the 2-1 reference surface and the 2-2 reference surface may be controlled according to the gradient angle of the first link or the base with respect to the pitch direction based on a ground surface perpendicular to a direction of a gravity. The 2-1 reference surface and the 2-2 reference surface may be rotated substantially same as the gradient angle of the first link or the base but may be rotated opposite to the direction of the gradient of the first link or the base, to be fixed.

In an example, the 2-1 reference surface and the 2-2 reference surface may be controlled according to the gradient angle of the first link or the base with respect to the yaw direction based on a ground surface perpendicular to a direction of a gravity. A quantity of the rotation of the 2-1 reference surface and the 2-2 reference surface may be controlled according to the gradient angle of the first link or the base, and the 2-1 reference surface may rotate opposite to the 2-2 reference surface and may be fixed.

In an example, the apparatus may further include 2-1 and 2-2 counterbalance apparatuses, and a 3-1 reference surface and a 3-2 reference surface. A first end of a third link may be rotationally connected to a second end of the second link to form a third joint which is a pitch direction rotational axis parallel with the ground surface. A weight center of the third link may be spaced apart from the third joint. First ends of the 2-1 and 2-2 counterbalance apparatuses may be connected to the third joint and second ends of the 2-1 and 2-2 counterbalance apparatuses may be combined with the third link so that a compensation torque for a tare weight of the third link is generated when the third link is rotated with respect to the third joint. The 3-1 reference surface and the 3-2 reference surface may be disposed to be aligned with a rotational axis of the third joint, and rotated with respect to a rotational axis of the third joint. The first end of the 2-1 counterbalance apparatus may be connected to the 3-1 reference surface. The first end of the 2-2 counterbalance apparatus may be connected to the 3-2 reference surface. The 3-1 reference surface may be connected to the 2-1 reference surface and the 3-2 reference surface may be connected to the 2-2 reference surface. Rotational angle and direction of the 3-1 reference surface may be substantially same as those of the 2-1 reference surface and rotational angle and direction of the 3-2 reference surface may be substantially same as those of the 2-2 reference surface.

In an example, the 2-1 reference surface and the 3-1 reference surface may be connected via a link member in which 4 bars are connected with a parallelogram shape, and the 2-2 reference surface and the 3-2 reference surface may be connected via a link member in which 4 bars are connected with a parallelogram shape.

In an example, the 2-1 reference surface and the 3-1 reference surface may be connected via a pulley and a belt, and the 2-2 reference surface and the 3-2 reference surface may be connected via a pulley and a belt.

In an example, when the first link is rotated with respect to the first joint with the base fixed, the 1-1 reference surface and the 1-2 reference surface may be fixed, and the 2-1 reference surface may rotate opposite to the 2-2 reference surface with substantially same rotational angle of the first link.

In an example, a first link rotational motor and a first link rotational reduction gear may be combined with the base, and a first link may be combined with a rotational axis of the first link rotational reduction gear. A 1-2 rotational axis of the 1-2 reference surface may be combined to pass through the rotational axis. A 1-1 rotational axis of the 1-1 reference surface may be combined to pass through the 1-2 rotational axis of the 1-2 reference surface. The rotational axis of the first link rotational reduction gear, the 1-2 rotational axis and the 1-1 rotational axis may be aligned with each other.

According to the example embodiments of the present invention, a compensation torque may be properly changed according to a change of the pay load of the robot which is a weight gripped by the robot, and the proper compensation torque may be generated for the pay load.

In addition, even though the weight of the robot arm is changed or the distance between the joint of the robot arm and the weight center is changed, the proper compensation torque may be generated.

In addition, the apparatus for adjustable counterbalance mechanism, when a multi degrees of freedom waist joint is included like the human type robot in which the angle of the reference surface is changed or when the robot is mounted on the mobile platform, the angle of the reference surface is changed according to the angle of the ground surface on which the robot moves or stops or the rotational angle of the pitch or yaw direction of the waist joint, and thus the compensation torque may be properly provided to each joint of the robot.

In addition, the quantity of the actuator required for the robot driving may be minimized, to decrease the damage of the human being when the human being is collided with the robot.

In addition, even though the angle of the reference surface is changed as the mounted position of the robot, the compensation torque may be properly provided to each joint of the robot, and thus the robot may be easily used to various kinds of fields.

BRIEF DESCRIPTION OF THE DRAWINGS

illustrating a concept of evaluating a compensation torque in the apparatus of FIG. 2.

Figure 1:
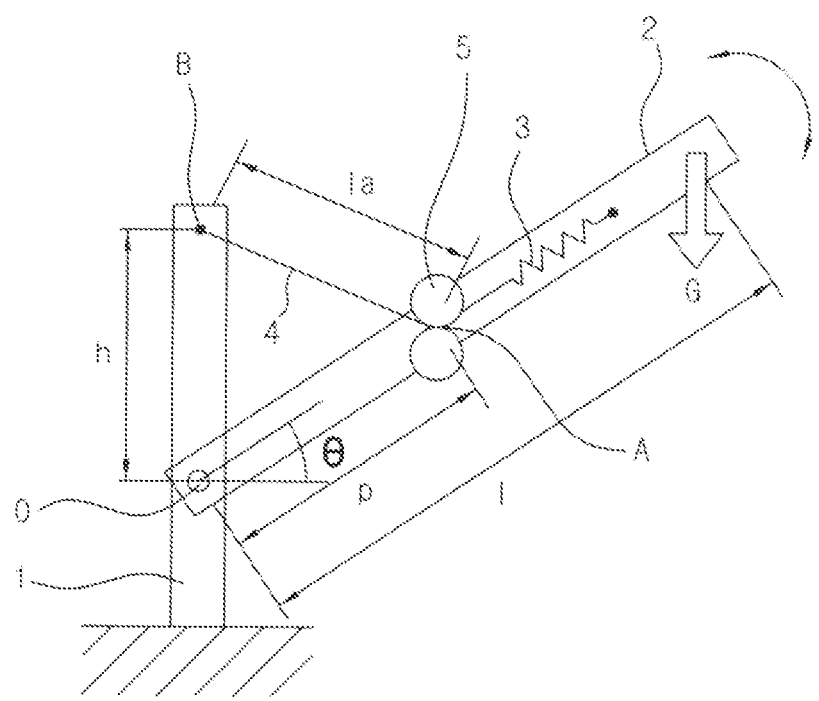
FIG. 1 is a schematic diagram illustrating a conventional mechanical tare weight compensation apparatus.

| * Reference numerals | | |
|---|---|---|
| 10: base | 11: first link | |
| J1: first joint | 12: second link | |
| J2: second joint | 13: third link | |
| J3: third joint | 14: first link rotational motor | |
| 15: first link rotational reduction gear | 15-1: reduction gear rotational axis | |
| 16: second link rotational motor | 17: third link rotational motor | |
| 100: reference surface | S: reference point | |
| 200: link | O: rotational center | |
| 210: protrusion portion | 300: variable weight | |
| M: weight center | | |
| 101: 1-1 counterbalance apparatus | 102: 1-2 counterbalance apparatus | |
| 110: coil spring | 120: guide rod | |
| 130: sliding block | 140: wire | |
| 150: roller | 201: 2-1 reference surface | |
| 211: 2-1 reference point | 221: 2-1 pulley | |
| 202: 2-2 reference surface | 212: 2-2 reference point | |
| 222: 2-2 pulley | 301: 1-1 reference surface controller | |
| 311: 1-1 reference surface control motor | 321: 1-1 reference surface | |
| 331: 1-1 rotational axis | 302: 1-2 reference surface controller | |
| 312: 1-2 reference surface control motor | 322: 1-2 reference surface | |
| 332: 1-2 rotational axis | 400: gradient sensor | |
| 410: elastic member(coil spring) | 420: spring fixed surface | |
| 430: spring block | 440: wire | |
| 450: idle roller | I: wire supporting point | |
| 500: compensation torque controller | 510: sliding block | 520: lead screw |
| 530: driving motor | 540: weight measuring sensor | |
| 501: main controller | 601: 2-1 counterbalance apparatus | |
| 602: 2-2 counterbalance apparatus | 610: coil spring | |
| 620: guide rod | 630: sliding block | |
| 640: wire | 650: roller | |
| 701: 3-1 reference surface | 711: 3-1 reference point | |
| 721: 3-1 pulley | 731: 3-1 belt | |
| 702: 3-2 reference surface | 712: 3-2 reference point | |
| 722: 3-2 pulley | 732: 3-2 belt | |
| 800: link member | JA: first joint | |
| JB: second joint | | |

DETAILED DESCRIPTION

Hereinafter, exemplary embodiment of the invention will be explained in detail with reference to the accompanying drawings.

Example Embodiment 1: An Apparatus for Adjustable Counterbalance Mechanism

Hereinafter, an apparatus for adjustable counterbalance mechanism capable of compensating a pay load, may be explained in detail.

Figure 2:
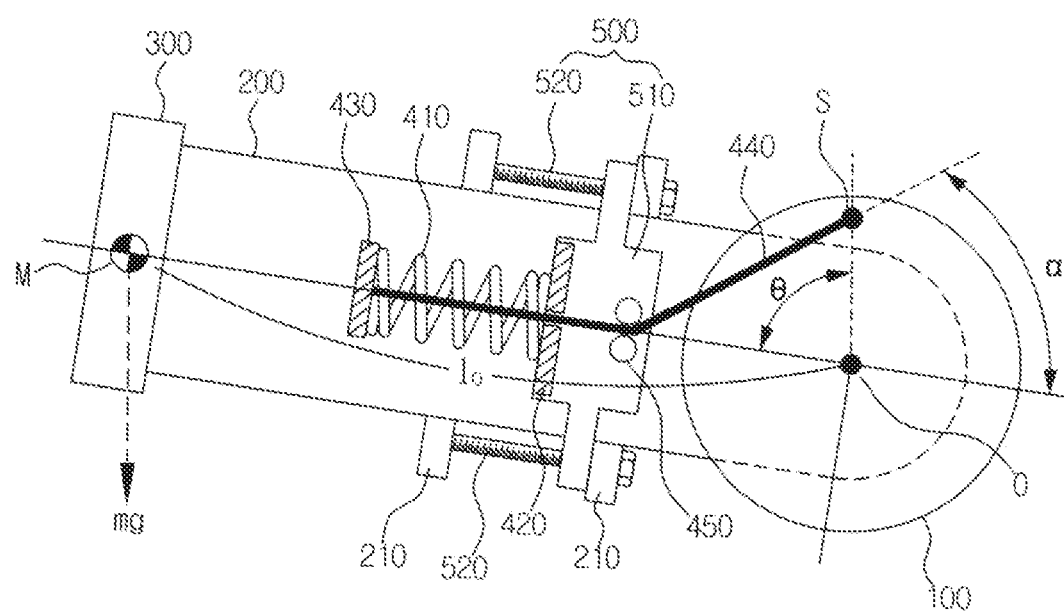
FIG. 2 is a front view illustrating an apparatus for adjustable counterbalance mechanism according to an example embodiment of the present invention.
Figure 3:
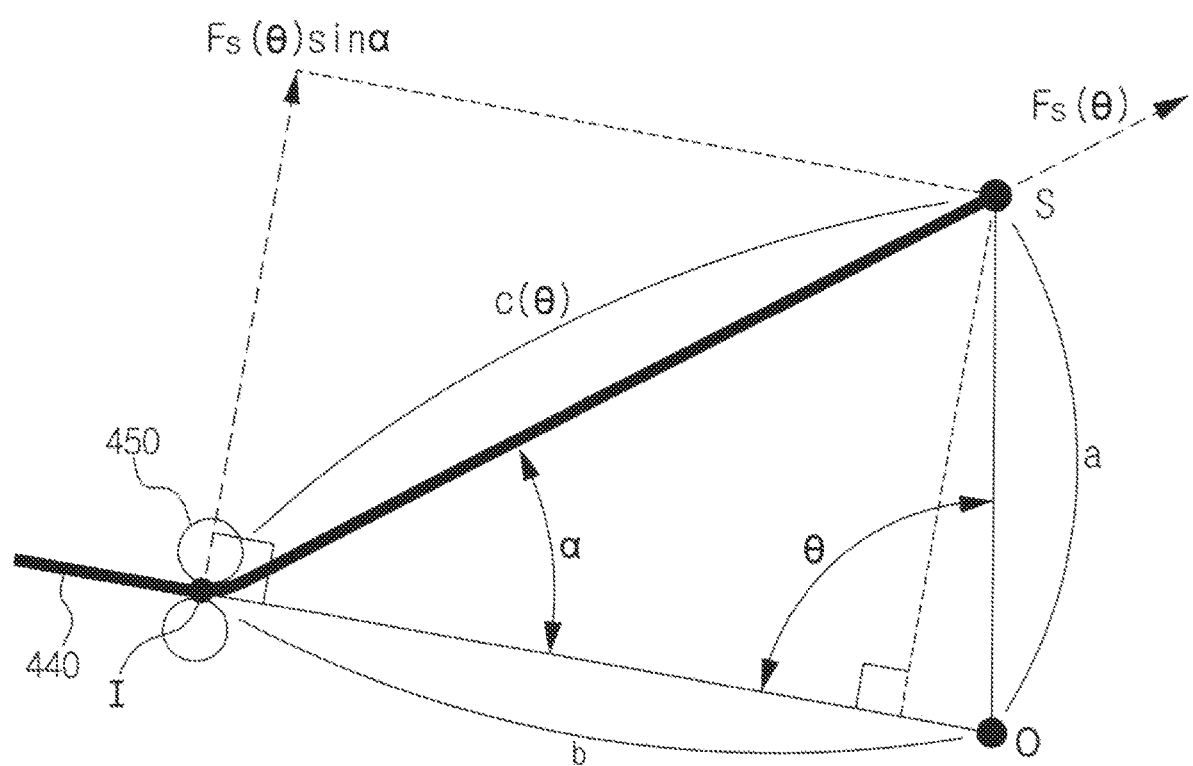
FIG. 3 is a conceptual diagram illustrating a concept of evaluating a compensation torque in the apparatus of FIG. 2.
Figure 4:
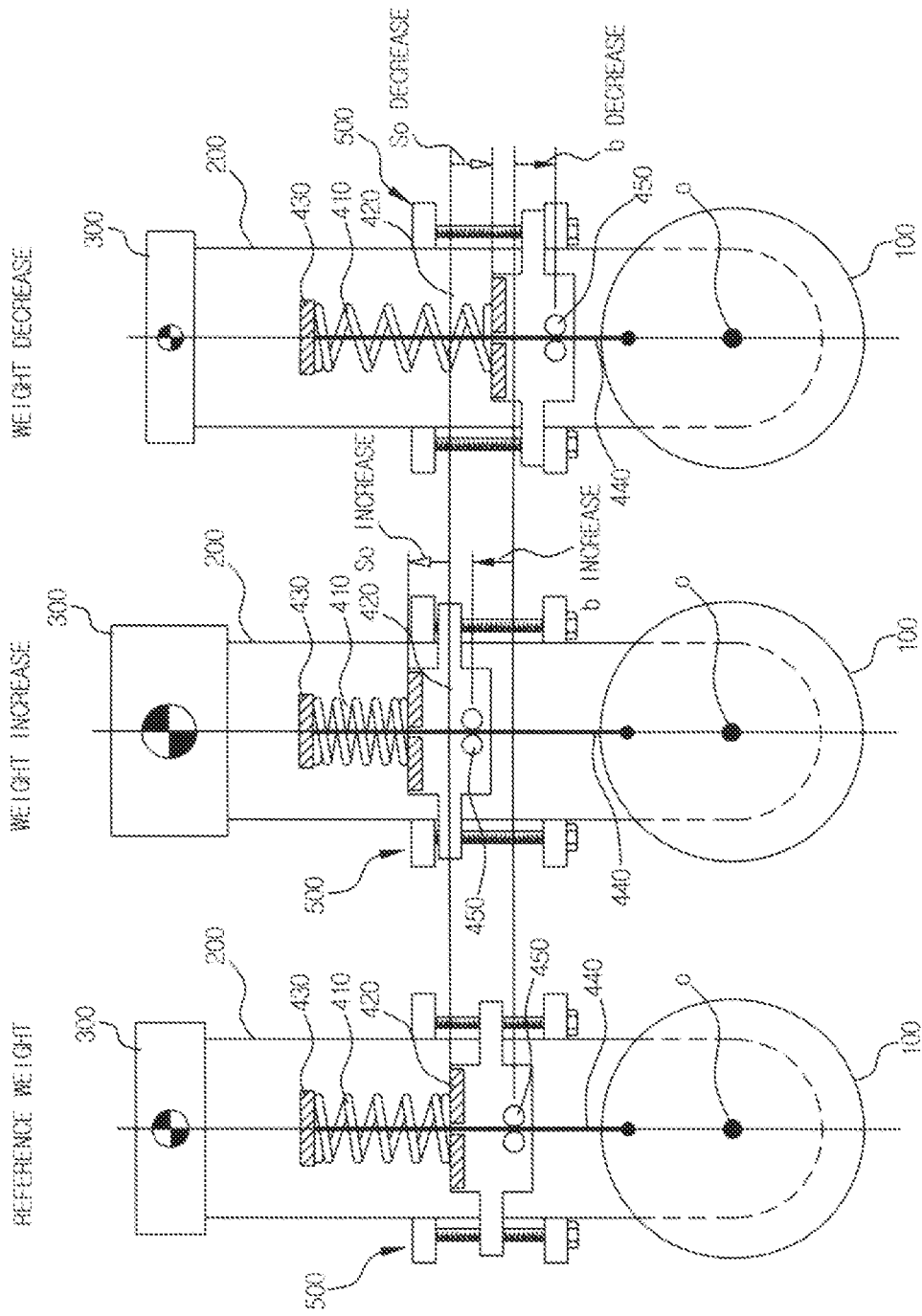
FIG. 4 is a front view illustrating an operation of a compensation torque controller as a pay load is changed, in the apparatus of FIG. 2.
Figure 5:
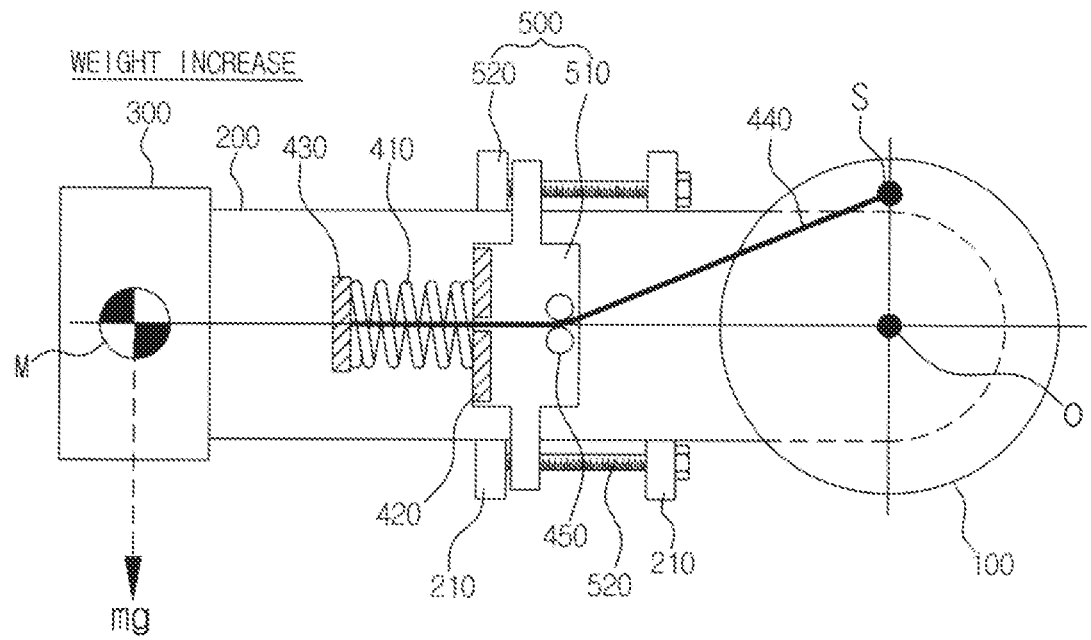
FIG. 5 is a front view illustrating the apparatus when a variable weight is increased with respect to a reference weight and a link is rotated to be parallel, in the apparatus of FIG. 2.
Figure 6:
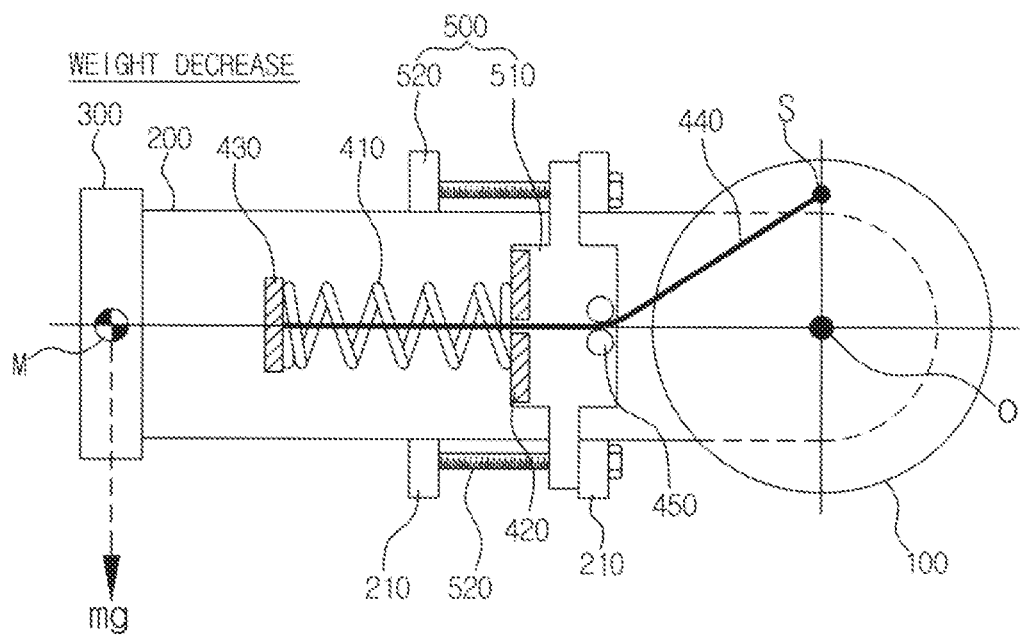
FIG. 6 is a front view illustrating the apparatus when the variable weigh is decreased with respect to the reference weight and the link is rotated to be parallel, in the apparatus of FIG. 2.

FIG. 1 is a schematic diagram illustrating a conventional mechanical tare weight compensation apparatus. FIG. 2 is a front view illustrating an apparatus for adjustable counterbalance mechanism according to an example embodiment of the present invention. FIG. 3 is a conceptual diagram Referring to FIGS. 2 to 8, the apparatus for adjustable counterbalance mechanism includes a reference surface 100, a link 200, an elastic member 410, a wire 440, an idle roller 450 and a compensation torque 500. The link 200 has a first end rotationally connected to the reference surface to form a rotational center O, and a weight center M of the link 200 is spaced apart from the rotational center O. The elastic member 410 has a first end combined with the link 200. The wire 440 has a first side combined with a second end of the elastic member 410, and a second side combined with the reference surface 100. The idle roller 450 is combined with the link 200 to support a portion between first and second ends of the wire 440. The compensation torque 500 controller is equipped to the link 200, to control the position of the idle roller 450 and an elastic force of the elastic member 410.

The reference surface 100 is fixed and reference member, and a base fixed to a ground surface may be the reference surface 100. Alternatively, the reference surface 100 may be combined with a fixed base and may be maintained fixed.

The link 200 corresponds to a robot arm. A first end of the link 200 along a longitudinal direction is connected to the reference surface 100 and is rotationally combined with the reference surface 100, to be a rotational center O. Here, a rotational axis forming the rotational center O may be parallel with the ground surface perpendicular to a direction of a gravity. The link 200 is longitudinally extended such that a weight center M is spaced apart from the rotational center O.

A first end of the elastic member 410 is combined with the link 200, and a second end of the elastic member 410 is combined with the reference surface 100, and thus as the link 200 rotates, the elastic force is generated to generate a compensation torque. Here, an elastic force from the elastic member 410 is changed according to a rotational angle of the link 200, and thus the compensation torque may be properly generated according to the rotational angle of the link 200. The elastic member 410 may be arranged in parallel along the longitudinal direction of the link 200, and as illustrated in the figure, a central axis along the longitudinal direction of the elastic member 410 is for the rotational center O.

The wire 440 connects the elastic member 410 with the reference surface 100. A first side of the wire 440 is combined with a second end of the elastic member 410, and a second side of the wire 440 is combined with a reference point S of the reference surface 100. Here, the reference point S may be vertically disposed over the rotational center O, with a direction opposite to the direction of the gravity.

The idle roller 450 is combined with the link 200. The idle roller 450 is disposed between both ends of the wire 440, to support the wire 440. Here, as illustrated in the figure, the idle roller 450 may be a pair, and the wire 440 is inserted and combined to pass through the portion between the pair of idle rollers 450, and thus the wire 440 may move only along the longitudinal direction of the wire 440 due to the idle roller 450.

In addition, the wire 440 from a portion combined with the elastic member 410 and a portion of the idle roller 450 should move only along the longitudinal direction. Thus, all elastic force applied to the wire 440 mentioned above may only be a tension.

The compensation torque controller 500 may be equipped to the link 200, and a position of the idle roller 450 may be controlled by the compensation torque controller 500. Thus, the elastic force of the elastic member 410 may be controlled by the compensation torque controller 500.

Here, the compensation torque applied to the link 200 is in proportion to the tension applied to the wire 440 connecting a wire supporting point I in which the idle roller 450 is disposed to the reference point S, and in proportion to a moment arm which is a vertical distance of the wire 440 connecting the wire supporting point I to the reference point S from the rotational center O (a vertical distance of a power generating the compensation torque spaced apart from a rotational center).

Thus, the compensation torque controller controls the elastic force from the elastic member 410, and controls the position of the idle roller 450 for controlling the moment arm.

Accordingly, the apparatus for adjustable counterbalance mechanism may change a compensation torque more easily via using the compensation torque controller 500 corresponding to a change of the pay load which is the weight gripped by the robot, and may generate the compensation torque properly corresponding to the pay load.

In addition, the compensation torque may be properly generated in case that the distance from the joint of the robot arm to the weight center changes or the weight of the robot arm changes, so that the gravity torque may be properly compensated.

In addition, the elastic member 410 may be a coil spring arranged along a longitudinal direction of the link 200, and the elastic force may be controlled by an initial compressive distance of the coil spring.

Here, the elastic member 410 may be the coil spring, and as illustrated in the figure, the coil spring may be a compressive coil spring in which the elastic force may be changed in proportion to the distance compressed along the longitudinal direction, or alternatively the elastic member 410 may be a tensile coil spring. When the link stands upwardly, the gravity torque is not applied, and here, the moment of the arm is zero and the coil spring is compressed by a predetermined distance.

Thus, when a variable weight is applied to the second end of the link (which means that the weight applied to the link is changed), the initial compressive distance $S_o$ of the coil spring may be controlled to control the elastic force of the coil spring.

Here, as the weight of the variable weight increases, the initial compressive distance $S_o$ increases to increase the elastic force and to increase the compensation torque. Alternatively, as the weight of the variable weight decreases, the initial compressive distance $S_o$ decreases to decrease the elastic force and to decrease the compensation torque.

In addition, the spring fixed surface 420 is combined with the link 200. The spring fixed surface 420 may move and be fixed along the longitudinal direction of the link 200, and the first end of the elastic member 410 is supported by the spring fixed surface 420. The idle roller 450 is combined with the link 200, and may move or be fixed along the longitudinal direction of the link 200.

The spring fixed surface 420 is combined with the link 200, to support the first end of the coil spring which is the elastic member 410. Here, the spring fixed surface 420 is combined with the link 200, and may move along the longitudinal direction of the link 200 and may be fixed at an arbitrary position along the longitudinal direction of the link 200.

In addition, the idle roller 450 may be combined with the link 200, and may move along the longitudinal direction of the link 200 and may be fixed at an arbitrary position along the longitudinal direction of the link 200. Here, the spring fixed surface 420 and the idle roller 450 may be changed variously with being guided straightly along the longitudinal direction of the link 200.

The second end of the coil spring (elastic member 410) is combined with the wire 440. The spring block 430 is combined with the second end of the coil spring, and wire 440 is combined with the spring block 430. Thus, as the wire 440 is tightened or released, the coil spring may be compressed or restored between the spring fixed surface 420 and the spring block 430.

In addition, the sliding block 510 is combined with the link 200, and moves and is fixed along the longitudinal direction of the link 200. Thus, the spring fixed surface 420 may be combined and fixed with the sliding block 510, and the idle roller may be combined and fixed with the sliding block 510.

The sliding block 510 is combined with the link 200, and may move along the longitudinal direction of the link 200 and may be fixed at an arbitrary position along the longitudinal direction of the link 200. In addition, the spring fixed surface 420 is combined and fixed with the sliding block 510, and the idle roller 450 is combined and fixed with the sliding block 510.

Accordingly, the spring fixed surface 420 and the idle roller 450 are combined with the sliding block 510 at the same time, and thus, the spring fixed surface 420 and the idle roller 450 may move together, as the sliding block 510 moves. Likewise, the spring fixed surface 420 and the idle roller 450 may be fixed together, as the sliding block 510 is fixed.

In addition, a first side or both sides of a lead screw 520 may be rotationally combined with the link 200, and the lead screw 520 may be combined with the sliding block 510 by a screw.

For example, with the lead screw rotationally combined with the link 200 and combined with the sliding block 510 by the screw, the sliding block may move to be positioned along a first side direction or a second side direction of the longitudinal direction of the link 200 as the rotational direction of the lead screw 520. In addition, the lead screw 520 may be rotationally combined with the link 200, and may be fixed without moving along the longitudinal direction of the link 200.

Alternatively, the lead screw 520 is combined with the link 200 by the screw and thus the link 200 move longitudinally as the lead screw 520 rotates. Further, the sliding block 510 is combined with the lead screw 520, so that the sliding block 510 may be rotated but may be fixed along the longitudinal direction. Here, the lead screw 520 may be a normal screw, or may have a various kinds of shapes capable of moving and fixing the sliding block 510.

Thus, the sliding block 510 may move along the longitudinal direction via using the lead screw 520, and the position of the sliding block 510 may be correctly controlled. Further, the sliding block 510 may be fixed at a position after the position is controlled.

In addition, at least more than two the lead screws 520 may be equipped at both directions perpendicular to the longitudinal direction of the link 200.

Due to the position of the coil spring 410 or the wire 440, the lead screw 520 may be not be positioned to push the central portion of the sliding block 430, so that at least two lead screw 520 may be disposed to be perpendicular to the longitudinal direction of the link 200 or be parallel with a width direction of the link 200 to be aligned with the link 200.

Thus, the lead screw 520 may not be interfered with other elements, and may be controlled more easily. Protrusions 210 are formed on an outer side of the link 200, and the lead screw 520 is combined with the protrusions 210. In addition, a protrusion may be formed on the sliding block 510 so that the lead screw 520 may be combined with the protrusion.

In addition, a driving motor 530 is fixed with the link 200, and is connected to the lead screw 520, to rotate the lead screw 520.

For example, the driving motor 530 (actuator) such as a stepping motor or a servo motor, is connected to the lead screw 520, to rotate the lead screw 520 easily, so that the moving position of the sliding block 510 may be precisely controlled.

When the lead screw 520 is at least 2, the lead screws 520 are connected with each other via a belt or a gear. Thus, all lead screws 520 may be rotated with a same direction by a same angle, when one of the lead screws 520 is rotated.

In addition, a weight measuring sensor 540 is attached to the link 200.

The weight measuring sensor 540 may be attached to the link 200, to measure the weight of the variable weight 300 gripped by the link 200. Thus, the compensation torque controller 500 is controlled via measuring the change of the weight, to control the compensation torque properly.

Here, as illustrated in the figure, the weight measuring sensor 540 may be equipped to the second end of the link 200, and alternatively, the weight measuring sensor 540 may be disposed at another position of the link 200 to measure the weight of the variable weight 300. For example, the weight measuring sensor 540 may be disposed on the reference surface 100 or on a base on which the reference surface 100 is formed.

Example Embodiment 2: A Method for Controlling an Apparatus for Adjustable Counterbalance Mechanism Hereinafter, a method for controlling the apparatus for adjustable counterbalance mechanism is explained.

The apparatus for adjustable counterbalance mechanism includes a reference surface 100, a link 200, an elastic member (a coil spring) 410, a wire 440, an idle roller 450 and a compensation torque controller 500. The link 200 has a first end rotationally connected to the reference surface 100 to form a rotational center O. A weight center M of the link 200 is spaced apart from the rotational center O. The elastic member 410 has a first end combined with the link 200. The wire 440 has a first side combined with a second end of the elastic member 410 and a second side combined with the reference surface 100. The idle roller 450 is combined with the link 200 to support a portion between first and second ends of the wire 440. The compensation torque controller 500 is equipped to the link 200, to control the position of the idle roller 450 and an elastic force of the elastic member 410.

Here, using the method for controlling the apparatus for adjustable counterbalance mechanism, as the weight applied to the second end of the link 200 increases, an initial compressive distance $S_o$ of the coil spring 410 and a distance b from the rotational center O to the wire supporting point I increase together. AS the weight applied to the second end of the link 200 decreases, the initial compressive distance $S_o$ of the coil spring 410 and the distance b from the rotational center O to the wire supporting point I decreases together.

Using the compensation torque controller 500, the position of the idle roller 450 and the elastic force of the coil spring 410 are controlled to control the compensation torque according to the pay load. Here, as the weight of the variable weight 300 increases, the initial compressive distance $S_o$ of the coil spring 410 increases and the distance b from the rotational center O to the wire supporting point I increases together, to increase the compensation torque.

Oppositely, as the weight of the variable weight 300 decreases, the initial compressive distance $S_o$ of the coil spring 410 decreases and the distance b from the rotational center O to the wire supporting point I decreases together, to decrease the compensation torque. Here, the coil spring 410 may be compressed by the predetermined initial compressive distance with respect to the reference weight, and the initial compressive distance $S_o$ may be a difference between a length of the uncompressed coil spring and a length of the compressed coil spring by the pre-pressure.

Thus, as the weight increases more than the reference weight, the initial compressive distance $S_o$ of the coil spring 410 is increased to compress the coil spring 410 more than the initial compressive distance $S_o$ of the coil spring 410 with respect to the reference weight. However, as the weight decreases more than the reference weight, the initial compressive distance $S_o$ of the coil spring 410 is decreased to compress the coil spring 410 less than the initial compressive distance $S_o$ of the coil spring 410 with respect to the reference weight.

For example, when the link is rotated by θ along a counterclockwise direction with respect to a vertical direction opposite to the gravity direction, with respect to the rotational center O of the link, the compensation for the gravity may be completed performed with the link 200 stopping without moving at the above-mentioned state. Thus, a gravity torque $T_g(\theta)$ applied to the link 200 with respect to the rotational center O by the gravity should be same as the compensation torque $Tc(\theta)$ for the gravity torque $T_g(\theta)$. Accordingly, the gravity torque $T_g(\theta)$ and the compensation torque $Tc(\theta)$ are related as Equation 1.

$$T_g(\theta) = mgl_c \sin\theta \quad \text{[Equation 1]}$$
$$T_c(\theta) = bF_s(\theta)\sin\alpha$$
$$\boxed{\text{since: } T_g(\theta) = T_c(\theta)}$$
$$mgl_c\sin\theta = bk\{s_o + c(\theta) - (b-a)\}\frac{a\sin\theta}{c(\theta)}$$
$$\boxed{\text{when: } s_o = b - a}$$
$$k = mgl_c / ab$$
$$T_c(\theta) = abk\sin\theta$$

Here,

θ: a rotational angle of the link from the vertical direction opposite to the gravity direction with respect to the rotational center a: a distance from the rotational center to the reference point b: a distance from the rotational center to the wire supporting point c(θ): a distance from the wire supporting point to the reference point when the link rotates by θ

α: an angle between a line connecting the rotational center to the wire supporting point, and a line connecting the wire supporting point to the reference point $S_o$: an initial compressive distance of the coil spring m: total weight applied to the weight center by the variable weight g: gravitational acceleration $l_c$: a distance between the rotational center to the weight center $F_s(\theta)$: a force generated by the compression of the coil spring (a tension applied to the wire)

k: an elastic coefficient of the coil spring

Accordingly, using Equation 1, the elastic coefficient k of the coil spring 410, the initial compressive distance $S_o$ of the coil spring 410, the distance a from the rotational center θ to the reference point I, and the distance b from the rotational center O to the wire supporting point I may be solved.

In addition, the initial compressive distance $S_o$ of the coil spring 410 with respect to the variable weight 300 and the distance b from the rotational center O to the wire supporting point I may be increased or decreased together, to control the compensation torque more correctly and precisely.

Here, as the weight applied to the second end of the link 200 changes, the initial compressive distance $S_o$ of the coil spring 410 and the distance b from the rotational center O to the wire supporting point I may be controlled to be increased or decreased together by same quantity.

Figure 7:
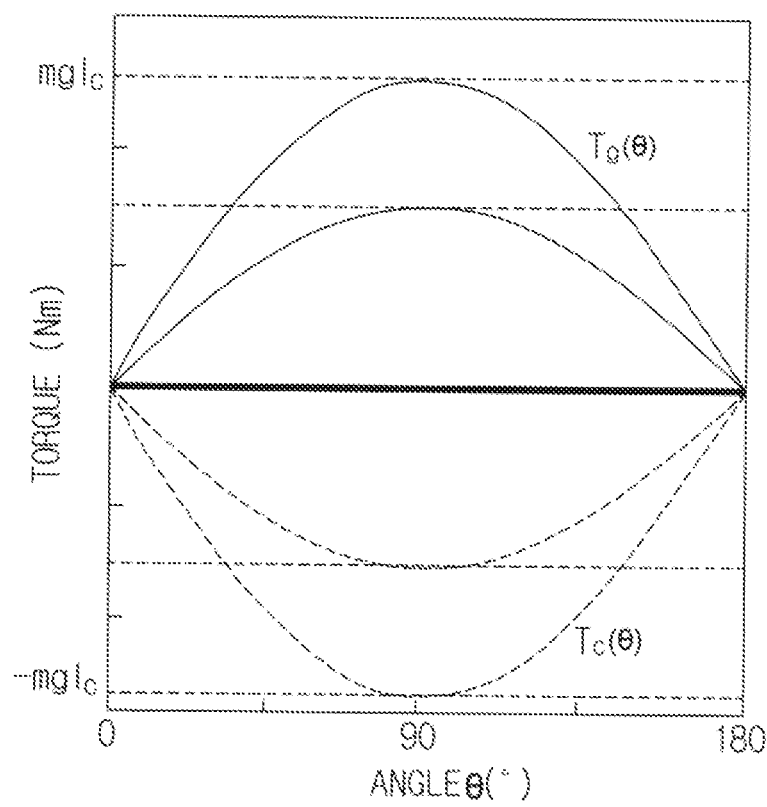
FIG. 7 is a graph illustrating a gravity torque and a compensation torque, in the apparatus of FIG. 2.
Figure 8:
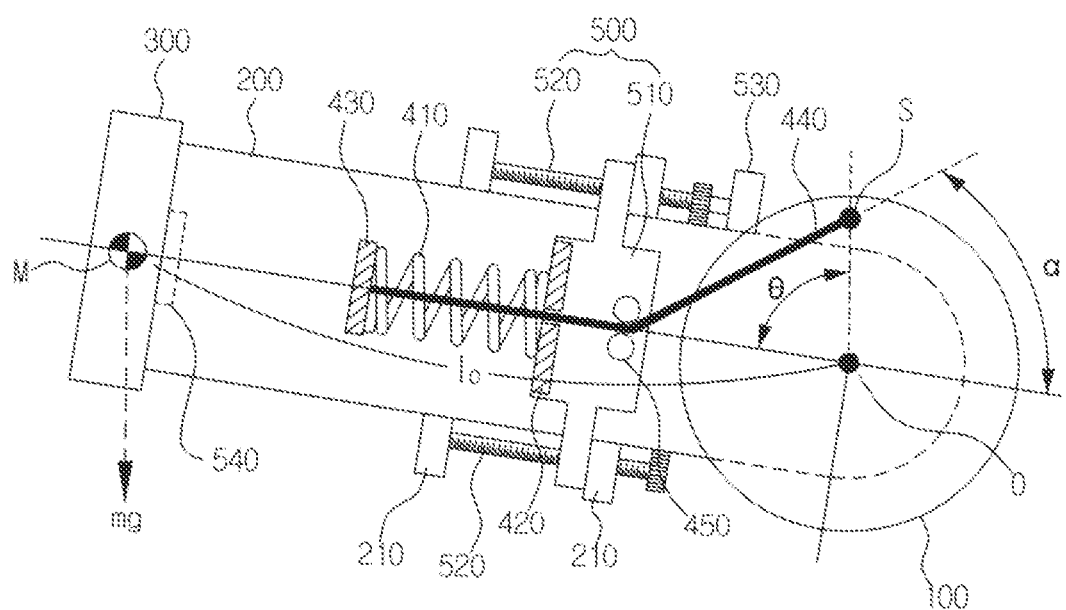
FIG. 8 is a front view illustrating a compensation torque controller in which a driving motor and a weight sensor are equipped, in the apparatus of FIG. 2.

As illustrated in FIG. 7, the gravity torque has a sine graph shape according to the rotational angle of the link 200, and thus to completely compensate the sine shape gravity torque, $S_o$=b−a should be satisfied. When the rotational angle θ of the link 200 is 0°, c(θ) is zero, the reference point S is fixed and thus a is constant.

Thus, as $S_o$ increases or decreases same as b, the compensation torque having an opposite direction to and same quantity with the gravity torque according to the change of the weight, may be generated. Thus, when the link is rotated by θ, the link 200 stops without moving at the state.

In addition, the compensation torque may be automatically or manually controlled according to the weight, via measuring the weight applied to the second end of the link 200.

The weight of the variable weight 300 is measured by the weight measuring sensor 540, and then the compensation torque controller 500 is manually controlled or automatically controlled by the lead screw 520 and the driving motor 530, to generate the compensation torque properly according to the measured weight. Here, the driving motor 530 and the weigh measuring sensor 540 are connected to the controller such that the compensation torque may be manually controlled or automatically controlled.

Hereinafter, referring to FIGS. 9 to 24, an apparatus for adjustable counterbalance mechanism according to another example embodiment of the present invention is explained. Here, the apparatus may perform adjustably to a change of two-axis ground surface angle.

Before explaining the apparatus for adjustable counterbalance mechanism according to the present example embodiment, a concept for the apparatus adjustable to the change of two-axis ground surface angle is firstly explained based on a robot arm having the apparatus for adjustable counterbalance mechanism.

Figure 9:
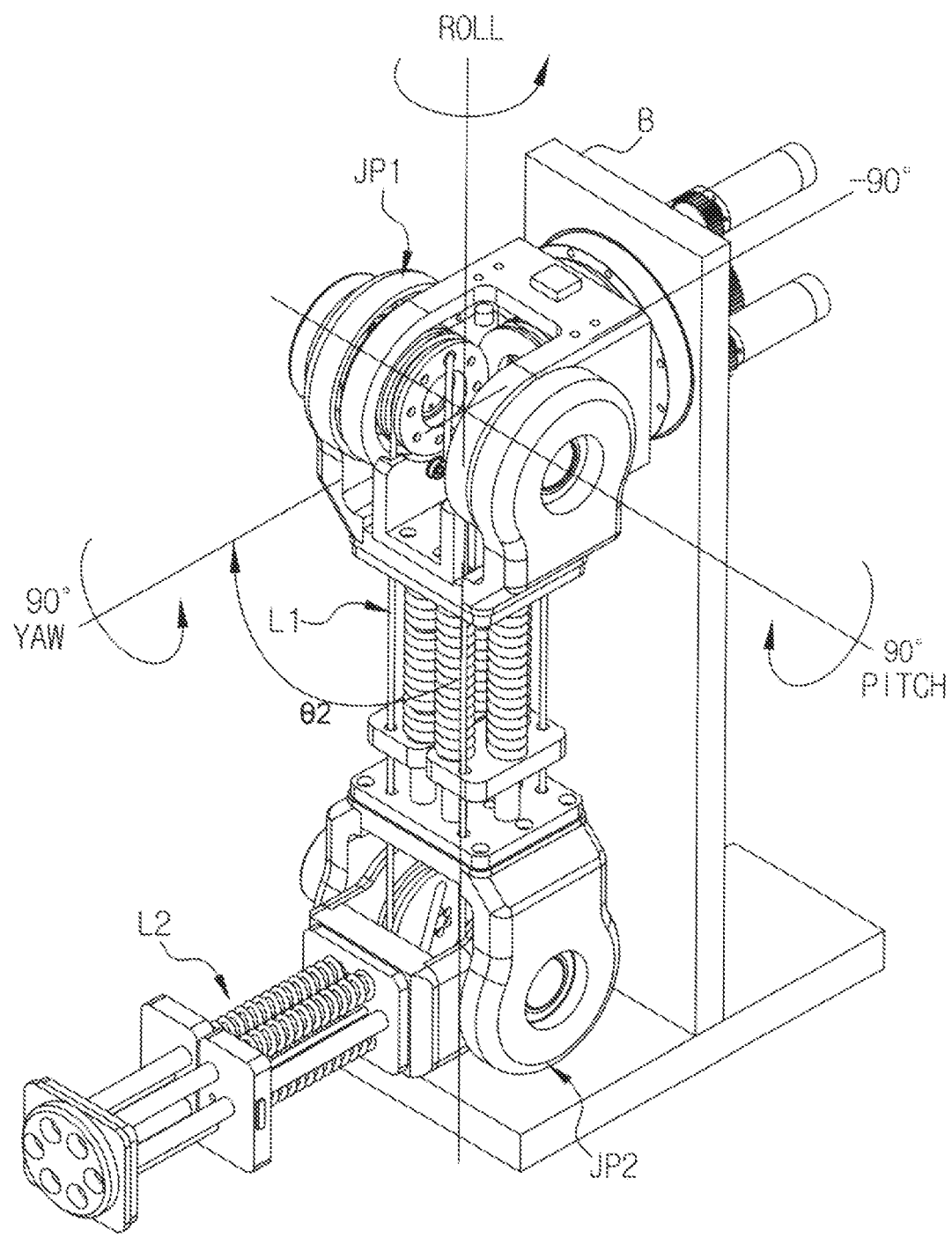
FIG. 9 and FIG. 10 are perspective views illustrating a robot arm having a counterbalance apparatus, to explain an apparatus for adjustable counterbalance mechanism according to another example embodiment of the present invention.
Figure 10:
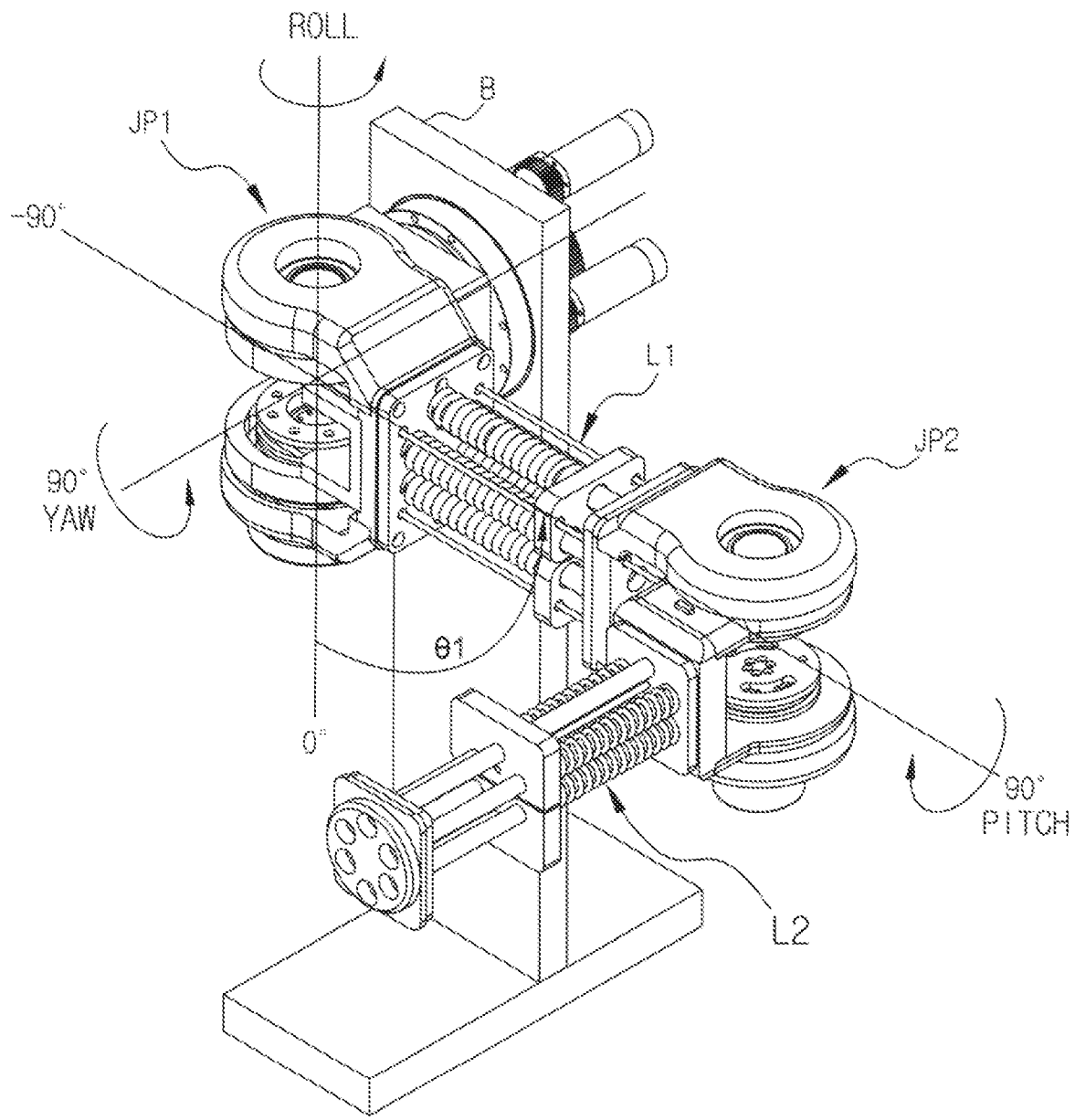
Figure 11:
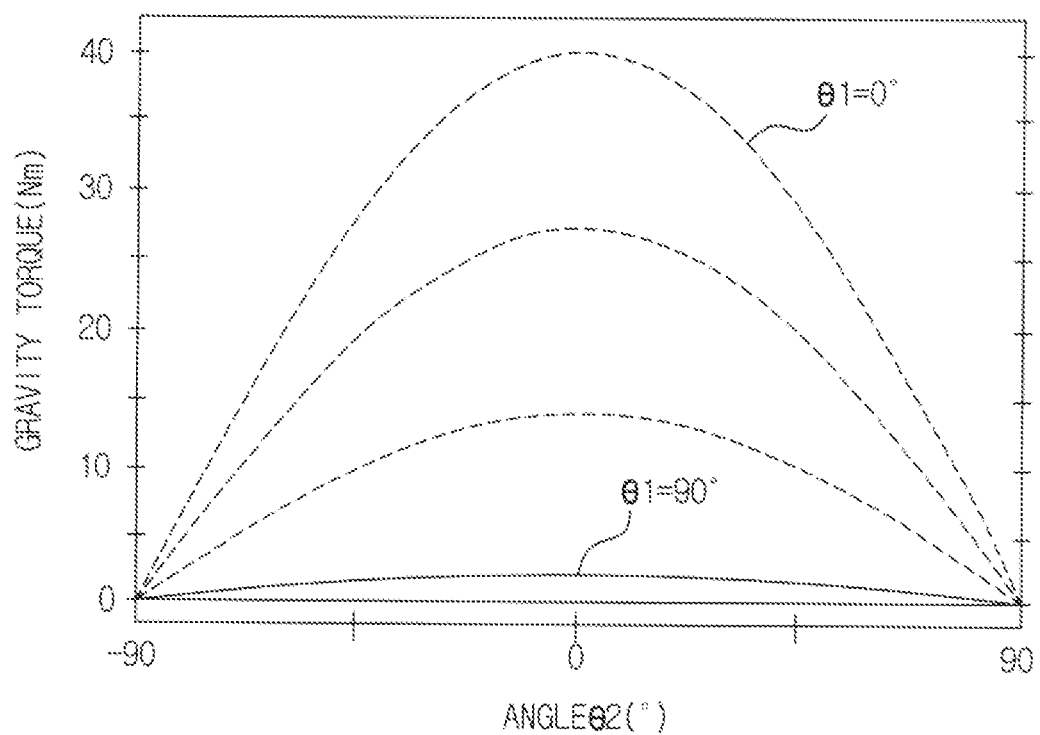
FIG. 11 is a graph illustrating a gravity torque according to a rotational angle with respect to a pitch direction rotational axis of the robot arm and a rotational angle with respect to a yaw direction rotational axis of the robot.
Figure 12:
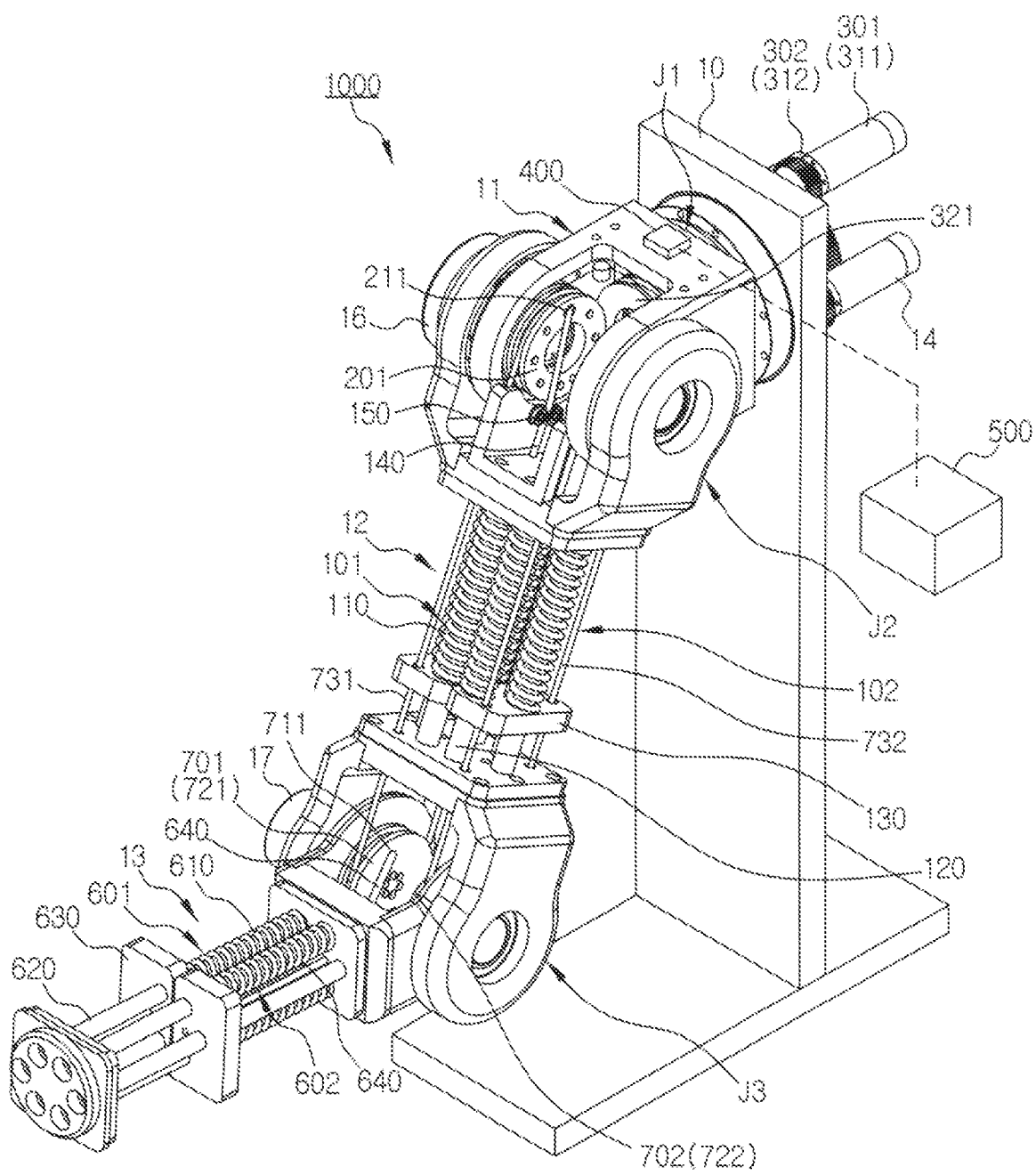
FIGS. 12 to 16 are respectively a perspective view, partially cross-sectional perspective view, a front cross-sectional view and a plane cross-sectional view illustrating an apparatus for adjustable counterbalance mechanism according to still another example embodiment of the present invention.
Figure 13:
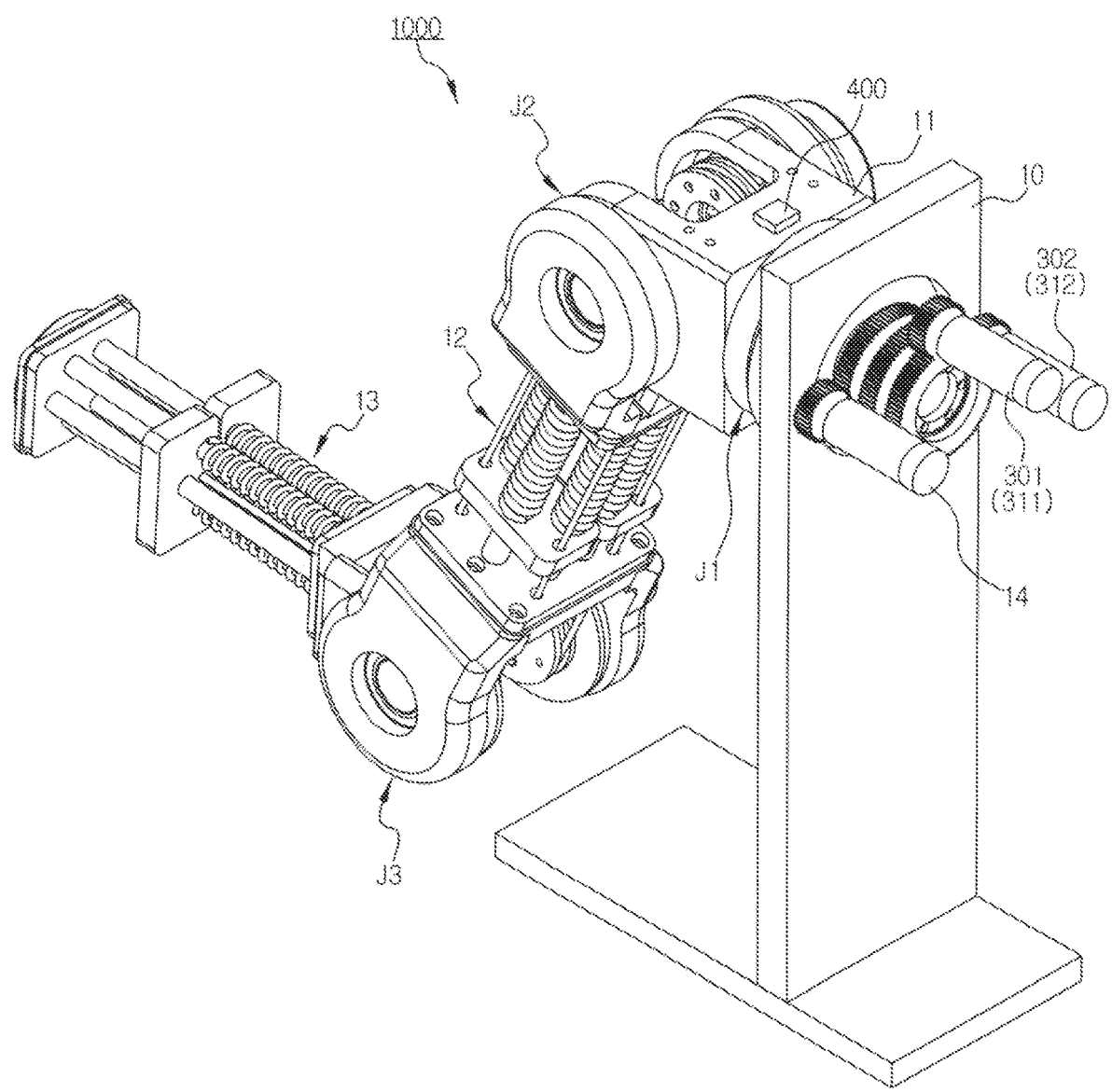
Figure 14:
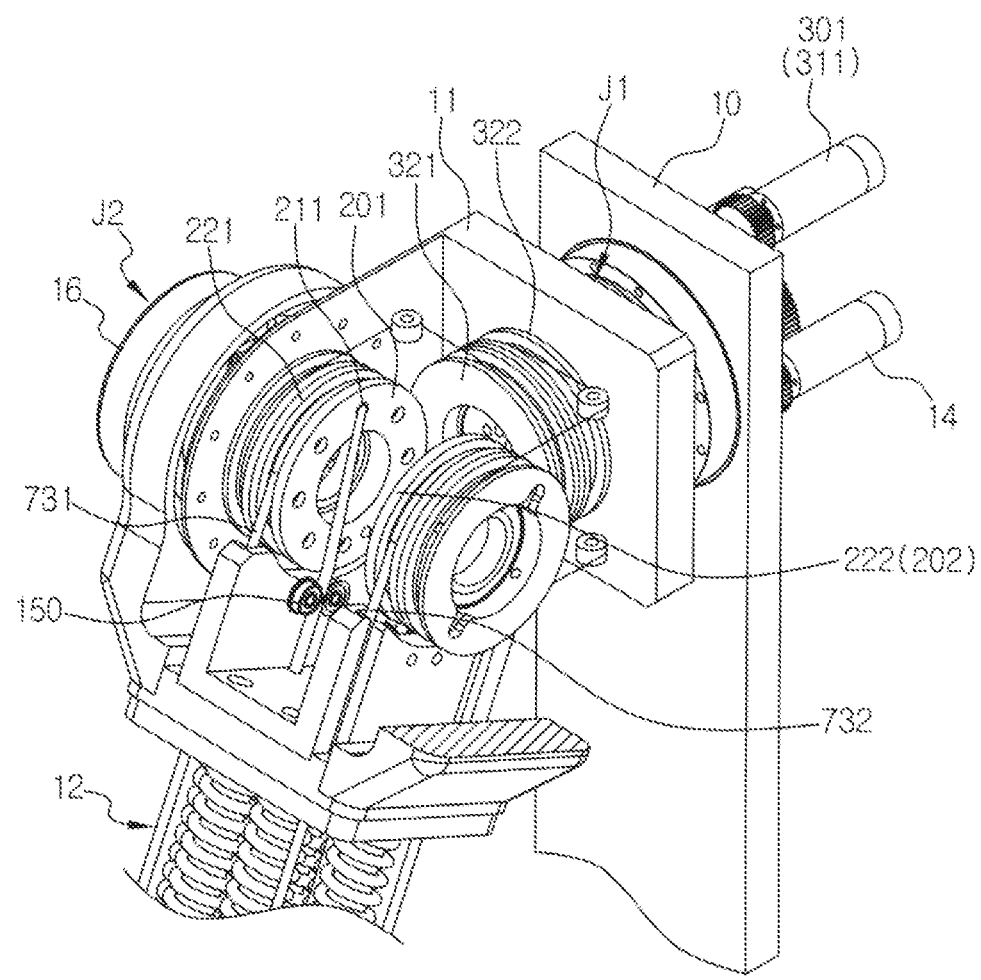
Figure 15:
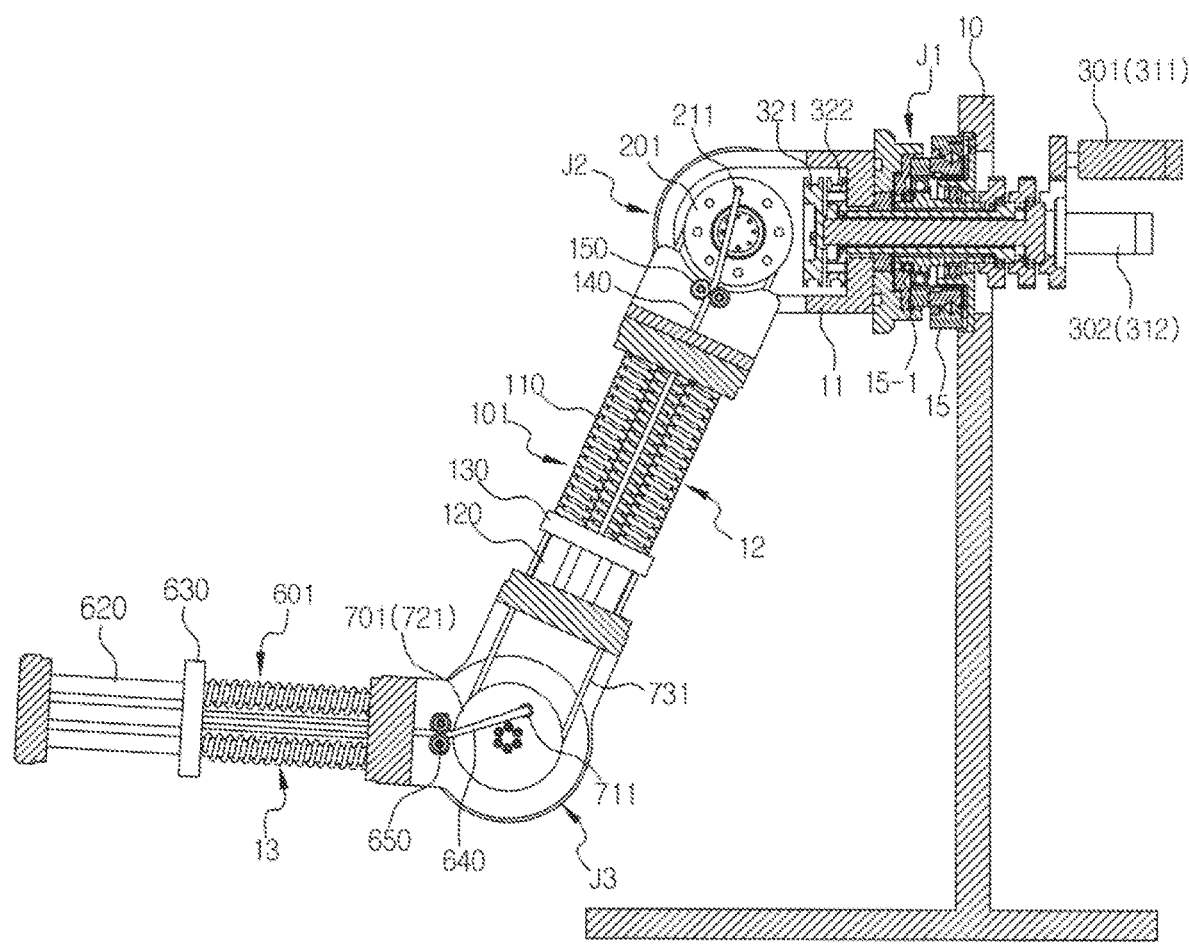
Figure 16:
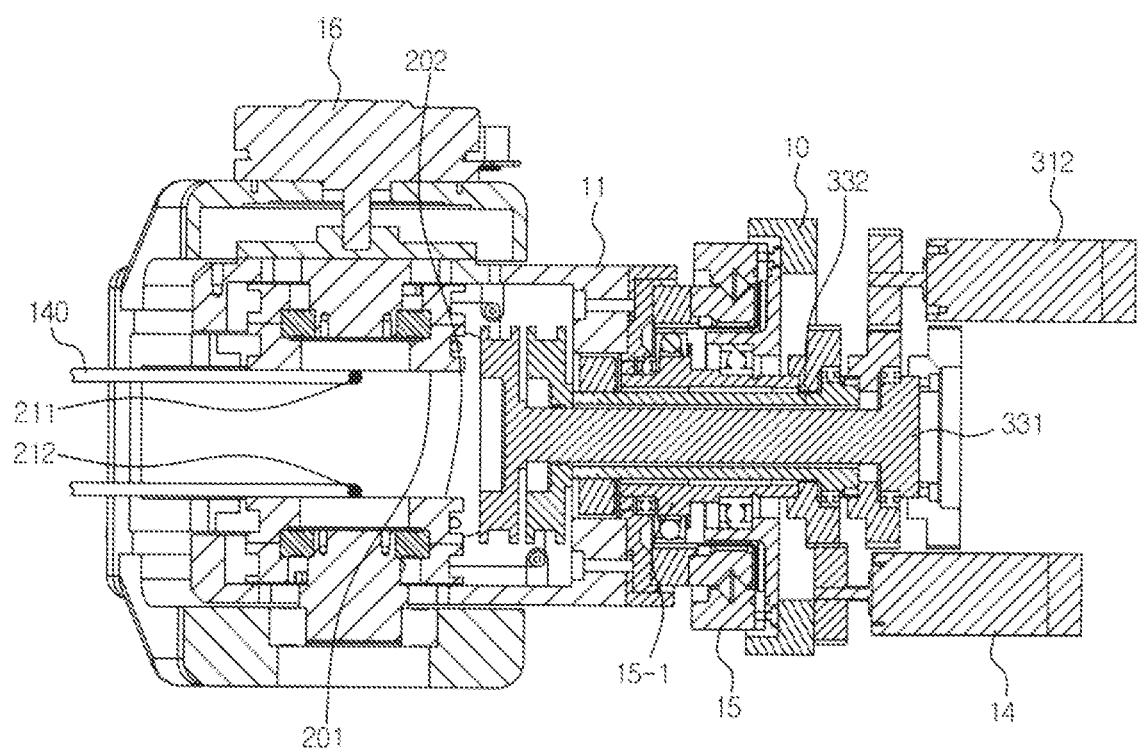

FIG. 9 and FIG. 10 are perspective views illustrating a robot arm having a counterbalance apparatus, to explain an apparatus for adjustable counterbalance mechanism according to another example embodiment of the present invention. FIG. 11 is a graph illustrating a gravity torque according to a rotational angle with respect to a pitch direction rotational axis of the robot arm and a rotational angle with respect to a yaw direction rotational axis of the robot.

Referring to FIGS. 9 and 11, the apparatus for the adjustable counterbalance mechanism, which is the apparatus having multi degrees of freedom adjustable to the change of two-axis ground surface angle, may be a torque-free robot arm generating the compensation torque properly to the gravity torque applied to each of the links, in cases that a base B of the robot arm in which the links are connected by at least one pitch joints and are rotated is rotated with respect to a pitch directional axis PITCH as illustrated in FIG. 9, that a link L1 is rotated with respect to a joint JP1 which is a pitch joint with the base B fixed, that all links including the joint JP1 are rotated with respect to the yaw directional axis YAW with the base B fixed, as illustrated in FIG. 10, and that the base B is rotated with respect to the yaw directional axis YAW together in FIG. 10.

The compensation torque may be generated properly to the gravity torque applied to each of the links including the cases that all links connected by the joints are rotated and the base is rotated.

For example, as illustrated in FIGS. 9 and 10, regarding to the gravity torque applied to the link L2 connected by the joint JP2 of the pitch joints by the rotational angle θ2 with respect to the pitch direction of the base B and the rotational angle θ1 with respect to the yaw direction of the base B, the gravity torque applied to the link L2 is maximum when the rotational angle θ2 of the base with respect to the pitch direction is 0°, the gravity torque is minimum when the rotational angle θ2 is −90° and 90°, the gravity torque is maximum when the rotational angle θ1 is 0°, and the gravity torque is minimum when the rotational angle θ2 is 90°.

Accordingly, the apparatus for adjustable counterbalance mechanism, may generate the compensation torque properly to the gravity torque changing according to the change of the angle of the base, such that the gravity torque may be compensated properly.

Example Embodiment 3: An Apparatus for Adjustable Counterbalance Mechanism

Hereinafter, the apparatus for adjustable counterbalance mechanism, which is the apparatus adjustable to the change of two-axis ground surface angle, is explained.

FIGS. 12 to 16 are respectively a perspective view, partially cross-sectional perspective view, a front cross-sectional view and a plane cross-sectional view illustrating an apparatus for adjustable counterbalance mechanism according to still another example embodiment of the present invention.

Referring to FIGS. 12 to 16, an apparatus for adjustable counterbalance mechanism includes 1-1 and 1-2 counterbalance apparatuses 101 and 102, a 2-1 reference surface 201 and a 2-2 reference surface 202, a 1-1 reference surface controller 301, and a 1-2 reference surface controller 302. A first link 11 is rotationally connected to a first end of a second link 12 to form a second joint J2 which is a pitch direction PITCH rotational axis parallel with a ground surface. A weight center of the second link 12 is spaced apart from the second joint J2. First ends of the 1-1 and 1-2 counterbalance apparatuses 101 and 102 are connected to the second joint J2 and second ends of the 1-1 and 1-2 counterbalance apparatuses 101 and 102 are combined with the second link 12 so that a compensation torque for a tare weight of the second link 12 is generated when the second link 12 is rotated with respect to the second joint J2. The 2-1 reference surface 201 and the 2-2 reference surface 202 are disposed to be aligned with a rotational axis of the second joint J2, and rotated with respect to a rotational axis of the second joint J2. The first end of the 1-1 counterbalance apparatus 101 is connected to the 2-1 reference surface 201. The first end of the 1-2 counterbalance apparatus 102 is connected to the 2-2 reference surface 202. A 1-1 reference surface controller 301 is combined with the first link 11, and connected to the 2-1 reference surface 201 to control and fix a rotational angle of the 2-1 reference surface 201. A 1-2 reference surface controller 302 is combined with the first link 11, and connected to the 2-2 reference surface 202 to control and fix a rotational angle of the 2-2 reference surface 202. The rotational angles of the 2-1 reference surface 201 and the 2-2 reference surface 202 are independently controlled.

The first end of the second link 12 is rotationally connected to the first link 11, to form the second joint J2 which is the pitch direction PITCH rotational axis parallel with the ground surface, and the weight center of the second link 12 may be spaced apart from the second joint J2.

The second link rotational motor 16 may be combined and fixed to the first link 11, and the first end of the second link 12 is connected to the second link rotational motor 16, such that the second link 12 may be rotated with respect to the second joint J2 which is a rotational axis.

The first ends of the 1-1 and 1-2 counterbalance apparatuses 101 and 102 are connected to the second joint J2 and second ends of the 1-1 and 1-2 counterbalance apparatuses 101 and 102 are combined with the second link 12, so that a compensation torque for a tare weight of the second link 12 is generated when the second link 12 is rotated with respect to the second joint J2. In addition, the torque free robot arm may be formed, such that the 1-1 and 1-2 counterbalance apparatuses 101 and 102 are connected to the second link 12 and the second joint J2 of the robot arm in parallel, to generate the compensation torque to the tare weight of the second link 12.

The base 10 may be formed and fixed at any positions of the robot, the equipment and the mobile platform, and may have various kinds of shape. The second link 12 may be rotated with respect to the second joint J2 which is the pitch direction rotational axis, and the weight center of the second link 12 may be spaced apart from the second joint J2.

Thus, in cases that the second link 12 is inclined not vertically positioned, the gravity torque may be generated due to the tare weight of the second link 12. In addition, the first end of the 1-1 counterbalance apparatus 101 is connected and is combined to the 2-1 reference surface 201, and the second end thereof is combined with the second link 12. Here, the 2-1 reference surface 201 is rotationally formed with respect to the rotational axis of the second joint J2, and is fixed without rotation when the base 10 is formed on the ground surface which is horizontal. However, as the second link 12 rotates, the compensation torque may be generated to compensate the gravity torque.

In addition, the first end of the 1-2 counterbalance apparatus 102 is connected and is combined to the 2-2 reference surface 202, and the second end thereof is combined with the second link 12. Here, the 2-2 reference surface 202 is rotationally formed with respect to the rotational axis of the second joint J2, and is fixed without rotation when the base 10 is formed on the ground surface which is horizontal. However, as the second link 12 rotates, the compensation torque may be generated to compensate the gravity torque.

Here, the 1-1 counterbalance apparatus 101 includes a guide rod 120, a coil spring 110, a sliding block 130, and a wire 140. Both ends of the second link 12 are combined and fixed by the guide rod 120. The guide rod 120 is inserted into the coil spring 110. The sliding block 130 is combined with the guide rod 120 to be slid along the guide rod 120, and is attached to the first end of the coil spring 110. A first end of the wire is connected to the sliding block 130, and a second end of the wire is connected to the 2-1 reference surface 201.

Here, both ends of the wire 140 are supported by a pair of rollers 150, and thus the wire 140 may smoothly move not to be detached.

Likewise, the 1-2 counterbalance apparatus 102 may be substantially same as the 1-1 counterbalance apparatus 101, to be connected to the 2-2 reference surface 202. Thus, the 1-1 and 1-2 counterbalance apparatuses 101 and 102 are connected in parallel, and thus the compensation torque compensating the gravity torque may be generated.

Figure 17:
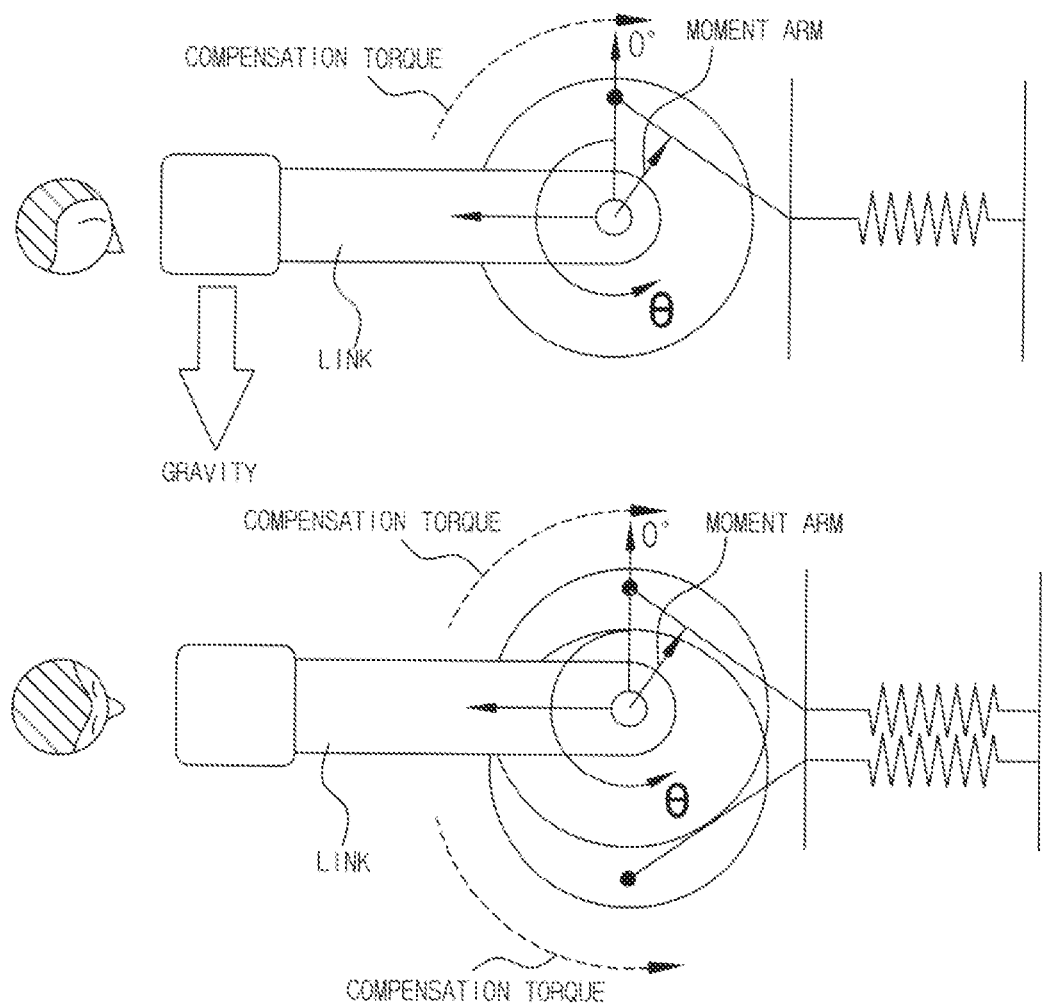
FIG. 17 is a conceptual view illustrating the apparatus of FIG. 12 arranged in parallel.

Here, the concept of the apparatus for adjustable counterbalance mechanism, and the concept of the apparatuses connected in parallel are illustrated in FIG. 17.

Figure 18:
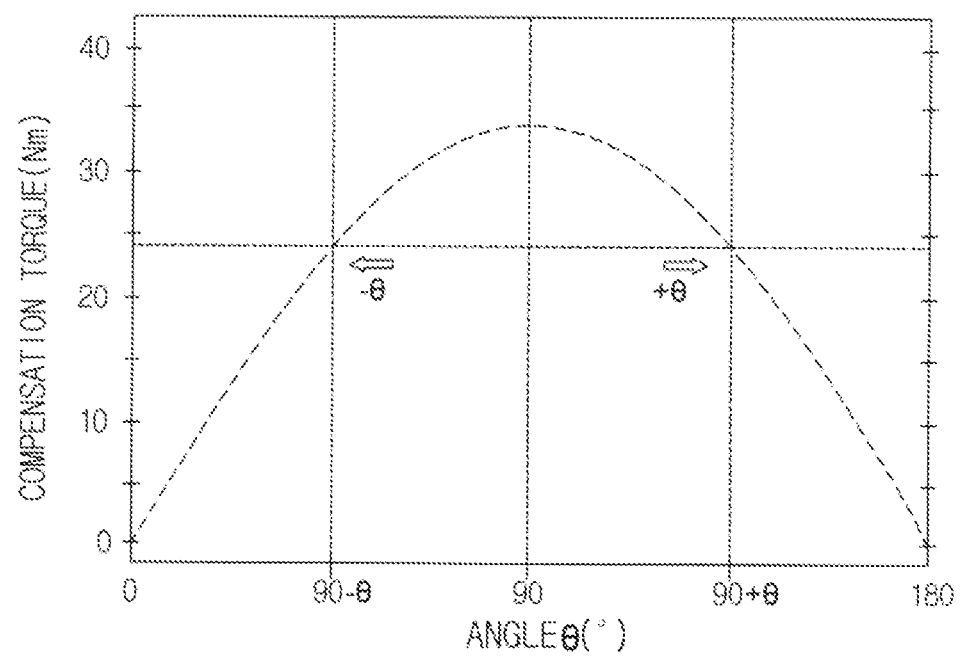
FIG. 18 is a graph illustrating a compensation torque according to an angle of the link in FIG. 17.

In addition, the compensation torque may be generated and be applied to the second link 12, according the angle θ of the second link 12, as illustrated in FIG. 18.

In addition, the 1-1 reference surface controller 301 and the 1-2 reference surface controller 302 are combined with the first link 11, and the 1-1 reference surface controller 301 is connected to the 2-1 reference surface 201 to control the rotational angle of the 2-1 reference surface 201. Here, with the rotational angle controlled, the 2-1 reference surface 201 may be fixed. In addition, the 1-2 reference surface controller 302 is connected to the 2-2 reference surface 202 to control the rotational angle of the 2-2 reference surface 202, and here with the rotational angle controlled, the 2-2 reference surface 202 may be fixed. Since the rotational angles of the 2-1 and 2-2 reference surfaces 201 and 202 are independently controlled, the compensation torque may be properly controlled according to the change of the two-axis ground surface angle, in case that two reference surfaces are rotated together for the angle to controlled, or in case that two reference surfaces are independently rotated for the angle to be controlled such that the first link 11 is inclined with respect to the pitch direction rotational axis, the first link 11 is inclined with respect to the yaw direction rotational axis, or the first link 11 is inclined with respect to both the pitch direction rotational axis and the yaw directional rotational axis.

Thus, when the surface on which the base 10 is disposed is not horizontal or the base 10 is disposed on the mobile platform which moves along the ground surface and thus the ground surface angle is changed with respect to two-axis direction, the angle of the second link 12 is changed and the gravity torque is changed due to the pay load of the second link 12. Thus, the angles of the 2-1 reference surface 201 and the 2-2 reference surface are changed by the 1-1 reference surface controller 301 and the 1-2 reference surface controller 302, to control the compensation torque.

Accordingly, the apparatus for adjustable counterbalance mechanism according to the present example embodiment, may provide the proper compensation torque to each joint of the robot via changing the angle of the reference surface according to the angle of the ground surface on which the robot moves or stops, or the pitch direction rotational angle and the yaw direction rotational angle of the waist joint of the robot, when the apparatus is disposed on the robot in which the angle of the reference surface is changed, such as a human type robot having multi degrees of freedom, or when the apparatus is disposed on the mobile platform.

In addition, in the apparatus for adjustable counterbalance mechanism, the first link 11 is rotationally connected to the base 10, to form the first joint J1 which is the yaw direction YAW rotational axis parallel with the ground surface.

Here, the 1-1 reference surface controller 301 includes a 1-1 reference surface 321, and a 1-1 reference surface control motor 311. The 1-1 reference surface 321 is disposed to be aligned with the rotational axis of the first joint J1, rotated with respect to the rotational axis of the first joint J1, and connected with the 2-1 reference surface 201. The 1-1 reference surface control motor 311 is connected to the 1-1 reference surface 321 and fixed with the base 10, to control and fix the rotational angle of the 1-1 reference surface 321.

The 1-2 reference surface controller 302 includes a 1-2 reference surface 322, and a 1-2 reference surface control motor 312. The 1-2 reference surface 322 is disposed to be aligned with the rotational axis of the first joint J1, rotated with respect to the rotational axis of the first joint J1, and connected with the 2-2 reference surface 202. The 1-2 reference surface control motor 312 is connected to the 1-2 reference surface 322 and fixed with the base 10, to control and fix the rotational angle of the 1-2 reference surface 322.

The first link 11 is rotationally connected to the base 10 via the first join J1 parallel with the ground surface, to form the robot arm. Here, the first link 11 is formed as the yaw direction rotational axis, to be perpendicular to the second joint J2 which is the pitch direction rotational axis, in the same plane.

The 1-1 reference surface control motor 311 is fixed to the base 10, the 1-1 reference surface 321 is combined and connected to the 1-1 reference surface control motor 311, and the 1-1 reference surface 321 is rotated with respect to the rotational axis of the first joint J1 to be connected with the 2-1 reference surface 201.

Thus, when the 1-1 reference surface control motor 311 is rotated, the 1-1 reference surface 321 is rotated and the 2-1 reference surface 201 is rotated together.

Likewise, the 1-2 reference surface control motor 312 is fixed to the base 10, the 1-2 reference surface 322 is combined and connected to the 1-2 reference surface control motor 312, and the 1-2 reference surface 322 is rotated with respect to the rotational axis of the first joint J1 to be connected with the 2-2 reference surface 202.

Thus, when the 1-2 reference surface control motor 312 is rotated, the 1-2 reference surface 322 is rotated and the 2-2 reference surface 202 is rotated together.

For example, the 1-1 reference surface 321, the 1-2 reference surface 322, the 2-1 reference surface 201 and the 2-2 reference surface 202 may be connected with each other via a pulley, a belt, a wire and so on, to be rotated.

Thus, in case connected via the yaw joint, the 1-1 reference surface controller 301 and the 1-2 reference surface controller 302 may be equipped.

In addition, the apparatus may further include a gradient sensor 400 equipped to the first link 11 or a base 10, to measure a rotational angle (gradient) of the first link 11 or the base 10 with respect to the pitch direction and the yaw direction.

When the first link 11 is inclined with respect to the pitch direction rotational axis or the first link 11 and the base 10 are inclined together with respect to the pitch direction rotational axis, the inclined angle is measured by the gradient sensor 400, to control the compensation torque of the 1-1 counterbalance apparatus 101 and the 1-2 counterbalance apparatus 102.

In addition, when the first link 11 is inclined with respect to the yaw direction rotational axis or the first link 11 and the base 10 are inclined together with respect to the yaw direction rotational axis, the inclined angle is measured by the gradient sensor 400, to control the compensation torque of the 1-1 counterbalance apparatus 101 and the 1-2 counterbalance apparatus 102.

Here, the gradient sensor 400 may be equipped to the first link 11 or the base 10, or to both of the first link 11 and the base 10. Further, the number and the position of the gradient sensor 400 may be variously changed. In addition, various kinds of sensor or measuring apparatus like a gyro sensor may be used as the gradient sensor 400.

In addition, the apparatus may further include a main controller 501 connected to the 1-1 reference surface controller 301, the 1-2 reference surface controller 302 and a gradient sensor 400, to control the rotational angle of the 2-1 reference surface 201 and the rotational angle of 2-2 reference surface 202 automatically, via the 1-1 reference controller 301 and the 1-2 reference controller 302 according to the gradient of the first link 11 or the base 10 measured by the gradient sensor 400.

The main controller 501 controls the rotational angle of the 2-1 reference surface 201 and the rotational angle of 2-2 reference surface 202 automatically, to generate the proper compensation torque, based on the measured angle, when inclined with respect to the pitch direction rotational axis and the yaw direction rotational axis.

In addition, the 2-1 reference surface 201 and the 2-2 reference surface 202 are controlled according to the angle of the first link 11 or the base 10 inclined with respect to the pitch direction, based on the ground surface perpendicular to the gravity direction. Here, the 2-1 reference surface 201 and the 2-2 reference surface 202 are rotated and fixed such that the angles of the first line 11 and the base 10 and the quantities of the inclinations of the first line 11 and the base 10 are same with each other, but the direction of the inclination of the first line 11 and the base 10 is different from each other.

Figure 19:
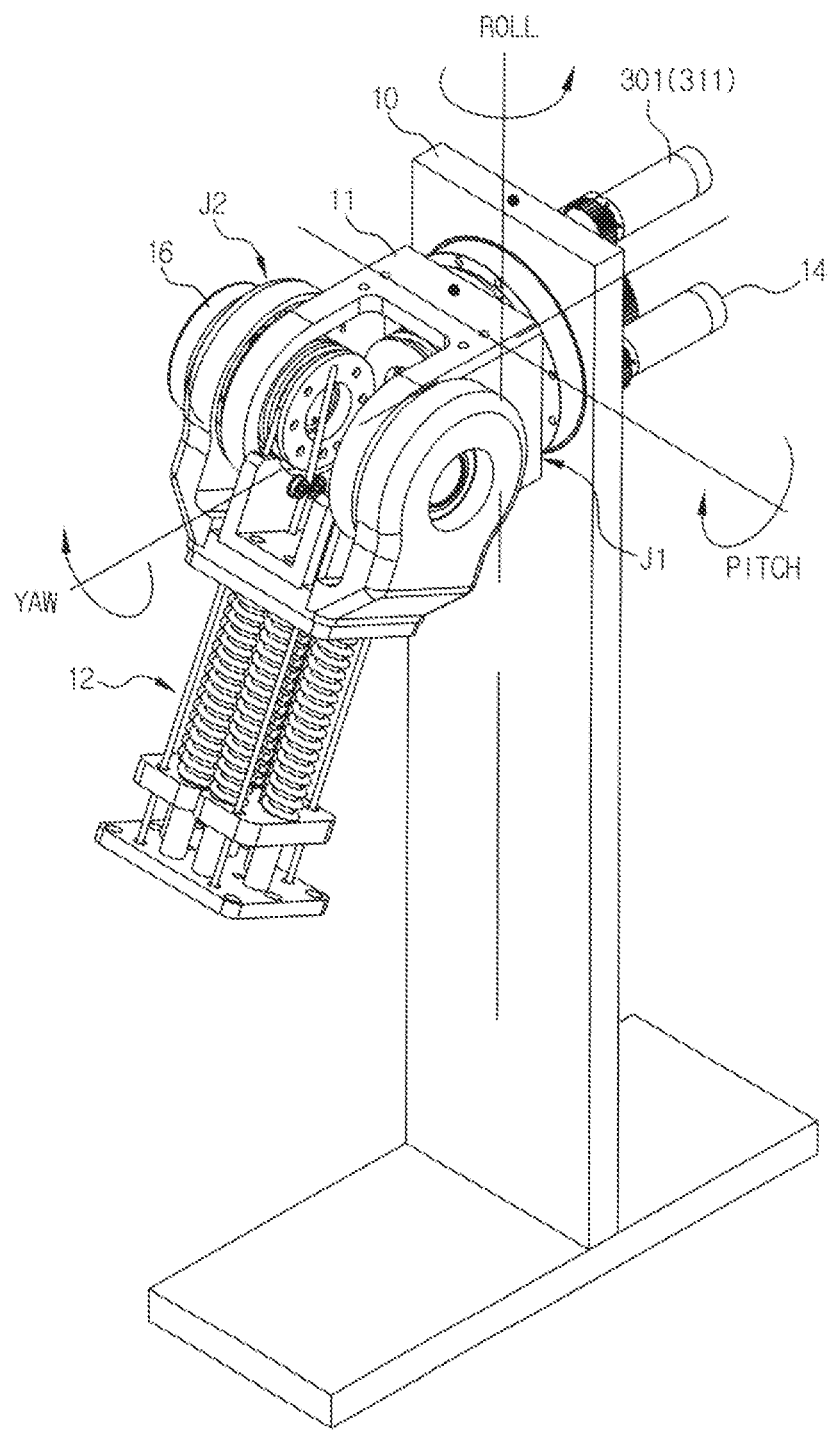
FIG. 19 is a partial perspective view illustrating the apparatus of FIG. 12 having a base fixed along two axes (a pitch direction rotational axis and a yaw direction rotational axis), in which the base is vertically fixed along a direction of a gravity.
Figure 20:
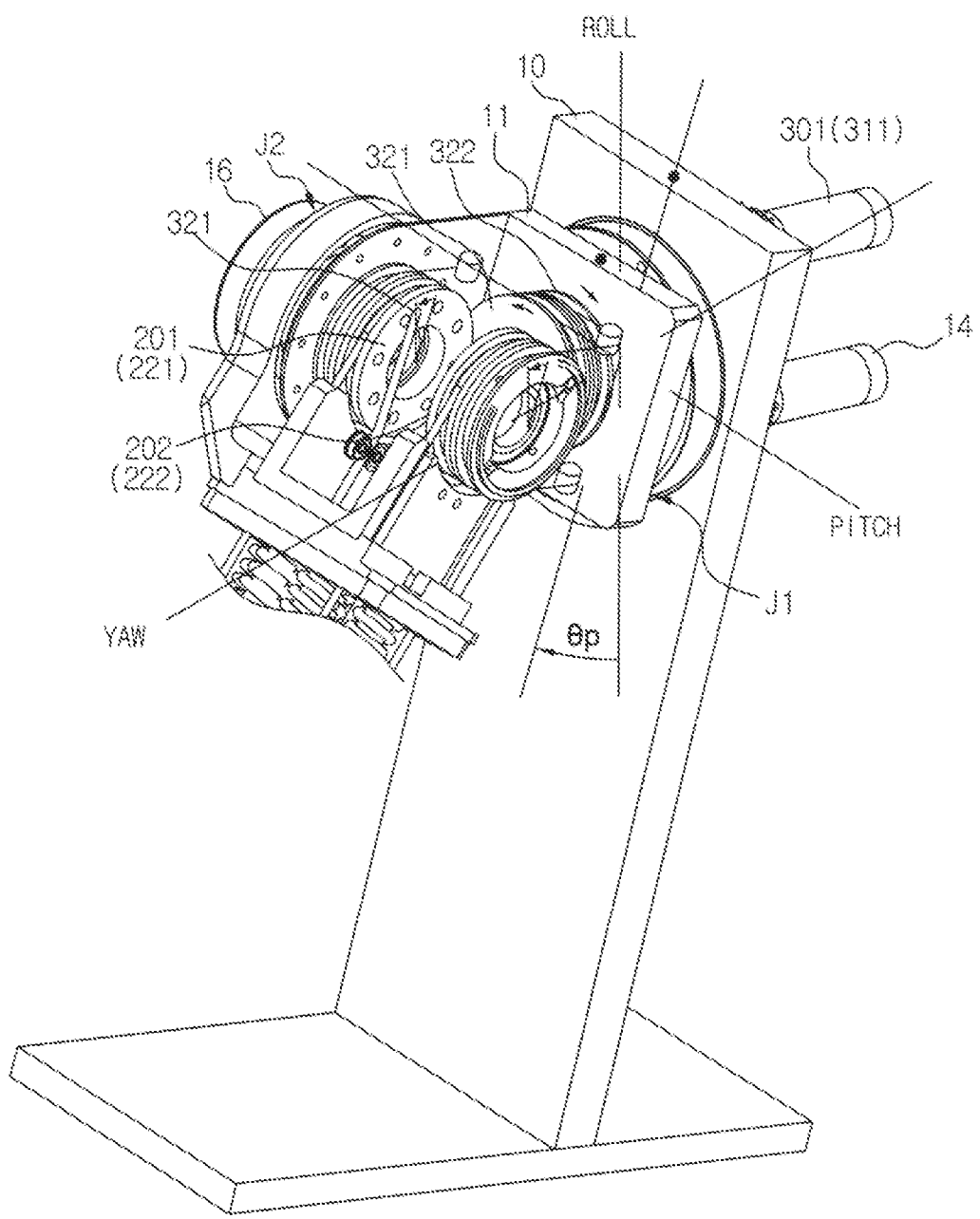
FIG. 20 is a partial perspective view illustrating the apparatus of FIG. 12 having a base rotated with respect to the pitch direction rotational axis by a predetermined angle.

Referring to FIGS. 19 and 20, in cases that the 2-1 reference point 211 of the 2-1 reference surface 201 and the 2-2 reference point 212 of the 2-2 reference surface 202 are disposed upwardly along the vertical direction from the central axis of the second joint J2, the first link 11 or the base 10 is rotated with respect to the pitch direction rotational axis by θp, and then the 2-1 reference surface 201 and the 2-2 reference surface 202 are rotated oppositely by −θp, and thus the 2-1 reference point 211 and the 2-2 reference point 212 are positioned upwardly along the vertical direction from the central axis of the second joint J2.

Here, the first link 11 and the base 10 are connected to the first joint J1 to be rotated with respect to the yaw direction rotational axis, and thus the first link 11 and the base 10 may be rotated together with respect to the pitch direction rotational axis.

In addition, the 2-1 reference surface 201 and the 2-2 reference surface 202 are controlled according to the inclined angle of the first link 11 or the base 10 with respect to the yaw direction, on the ground surface perpendicular to the gravity direction. Here, the rotational angle of the 2-1 reference surface 201 and the 2-2 reference surface 202 is controlled according to the inclined angle of the first line 11 or the base 10, and the 2-1 reference surface 201 and the 2-2 reference surface 202 are rotated oppositely to be fixed.

In cases that the 2-1 reference point 211 of the 2-1 reference surface 201 and the 2-2 reference point 212 of the 2-2 reference surface 202 are disposed upwardly along the vertical direction from the central axis of the second joint J2, that the weight center of the second link 12 is disposed on the plane formed by the yaw direction rotational axis and the roll direction rotational axis to prevent the gravity torque rotating the second link 12 from being applied with respect to the first joint J1 which is the yaw direction rotational axis, and that the second link 12 is disposed downwardly as illustrated in FIG. 19, the 2-1 reference surface 201 and the 202 reference surface 202 are rotated oppositely with the same angle to be fixed, when the first link 11 or the base 10 and the first link 11 are rotated with respect to the yaw direction rotational axis by θy.

Here, the compensation torque generated by the 1-1 counterbalance apparatus 101 and the compensation torque generated by the 1-2 counterbalance apparatus 102 may be gradually reduced.

For example, in case of being rotated with respect to the yaw direction rotational axis, the compensation torque applied to the second link 12 may be maximum when the second link 12 is downwardly, and may be gradually reduced until the second link 12 is in horizontal. Thus, the compensation torque may be 0, when the second link 12 is in horizontal.

Figure 21:
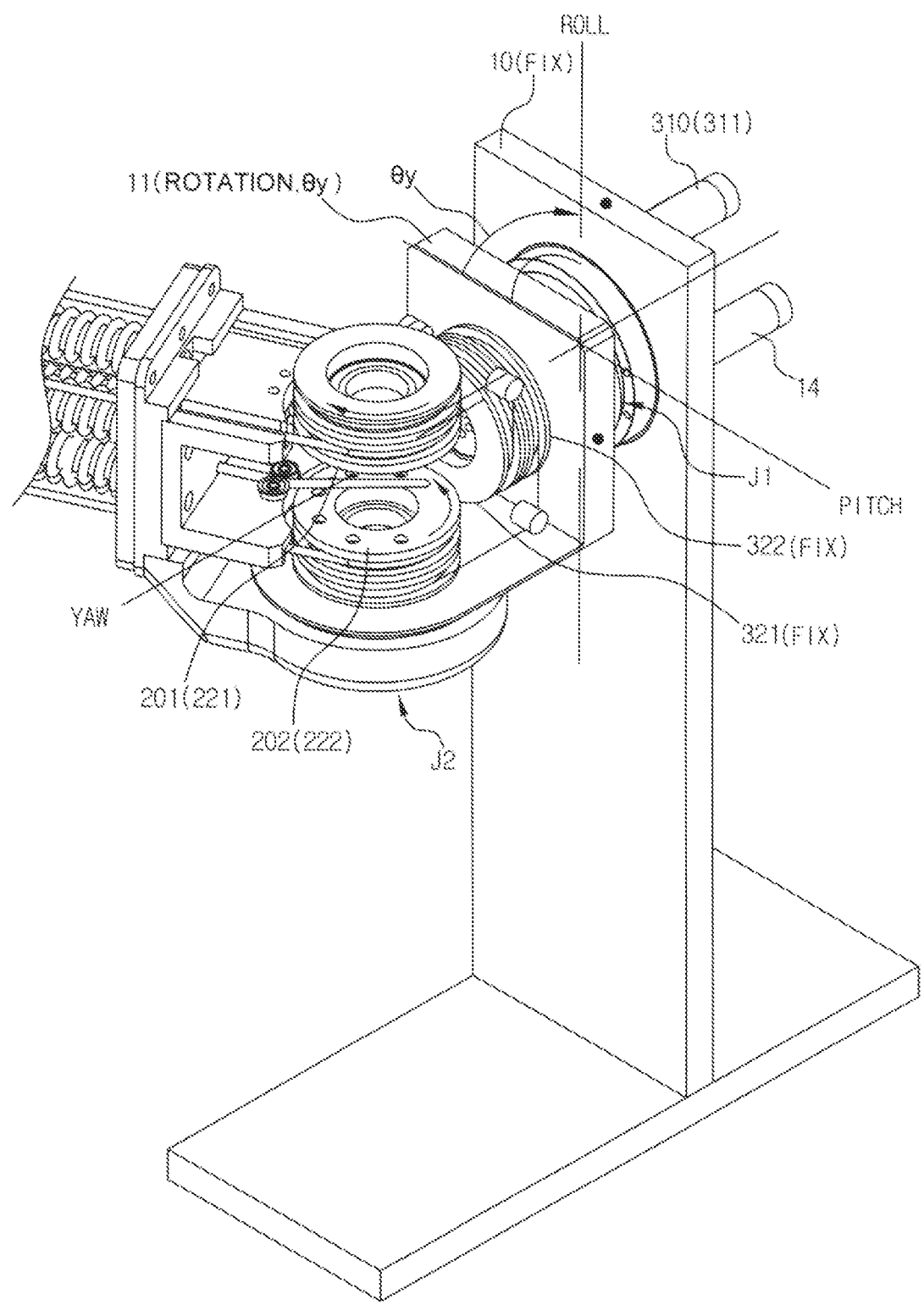
FIG. 21 is a partial perspective view illustrating the apparatus of FIG. 12, in which all elements including the base and a first link are rotated with respect to the yaw direction rotational axis by a predetermined angle such that a second link is in parallel with a rotational axis of a second joint is in a up and down direction.

Here, as illustrated in FIG. 21, with the base 10 vertically fixed with respect to the ground surface perpendicular to the gravity direction, the first link 11 may be rotated with respect to the yaw direction. Here, with the 1-1 reference surface 321 and the 1-2 reference surface 322 combined with the base 10 and fixed without rotation, a bracket of the first link 11 at which the 2-1 reference surface 201 and the 2-2 reference surface 202 are combined may be rotated along a θy direction due to the operation of the first link rotational motor 14, the 2-1 reference surface 201 connected to the 1-1 reference surface 321 via the wire and the pulley is rotated by θy along an arrow direction illustrated in the figure, and the 2-2 reference surface 202 connected to the 1-2 reference surface 322 via the wire and the pulley is rotated by θy along the arrow direction.

Here, the 1-1 reference surface controller 301 and the 1-2 reference surface controller 302 are not operated, and the 2-1 reference surface 201 and the 2-2 reference surface 202 are rotated oppositely so that the 2-1 reference point 211 and the 2-2 reference point 212 are disposed by 180°, and thus the compensation torque may be zero.

For example, a brake is equipped to the 1-1 reference surface control motor 311 and the 1-2 reference surface control motor 312, and thus the 1-1 reference surface 321 and the 1-2 reference surface 322 may be fixed in cases of normal operation in which the inclination of the robot base 10 is not changed.

Figure 22:
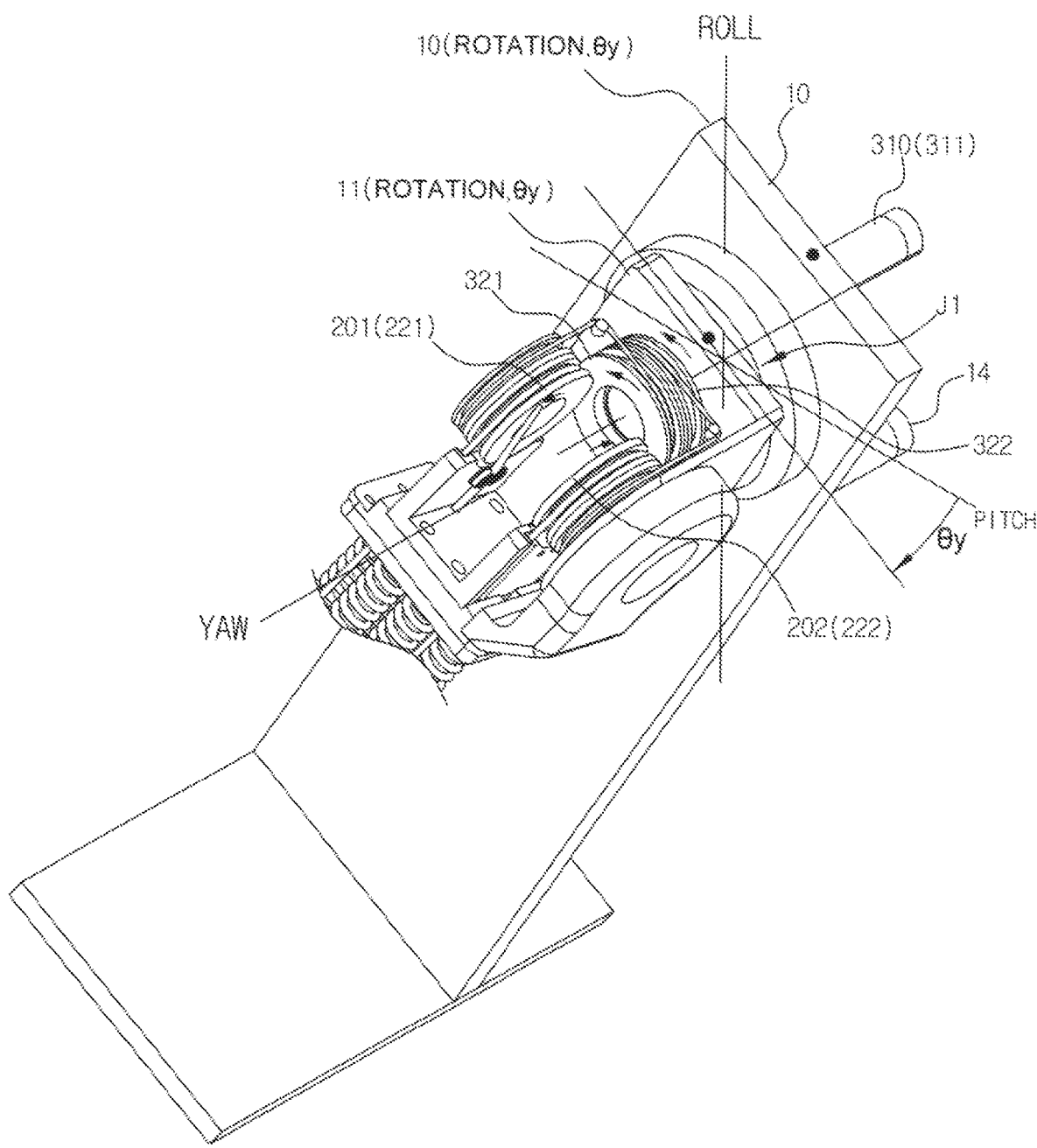
FIG. 22 is a partial perspective view illustrating the apparatus of FIG. 12, in which all elements including the first link except for the base, a 1-1 reference surface and a 1-2 reference surface are rotated with respect to the yaw direction rotational axis by a predetermined angle with the base vertically fixed along the direction of the gravity.

Alternatively, as illustrated in FIG. 22, the base 10 is rotated with respect to the yaw direction rotational axis on the ground surface vertical to the gravity direction, the first link 11 and the base 10 may be rotated together with respect to the yaw direction. Here, the 1-1 reference surface 321 and the 1-2 reference surface 322 are combined with the base 10, and thus the 1-1 reference surface 321, the 1-2 reference surface 322, the base 10, the 2-1 reference surface 201 and the 2-2 reference surface 202 may be rotated by θy direction with the bracket of the first link 11.

Here, since the 1-1 reference surface 321, the 1-2 reference surface 322, the 2-1 reference surface 201 and the 2-2 reference surface 202 have no rotation with respect to the rotational axes thereof, the 1-1 reference surface controller 301 and the 1-2 reference surface controller 302 are operated to rotate the 2-1 reference surface 201 and the 2-2 reference surface 202 oppositely to make the compensation torque zero. In addition, the 2-1 reference point 211 and the 2-2 reference point 212 are disposed by 180°, and the 2-1 reference point 211 and the 2-2 reference point 212 are disposed along the longitudinal direction of the second link 12, to make the compensation torque zero.

In addition, the apparatus for adjustable counterbalance mechanism may further include 2-1 and 2-2 counterbalance apparatuses 601 and 602, a 3-1 reference surface 701 and a 3-2 reference surface 702. A first end of a third link 13 is rotationally connected to a second end of the second link 12 to form a third joint J3 which is a pitch direction rotational axis parallel with the ground surface. A weight center of the third link 13 is spaced apart from the third joint J3. First ends of the 2-1 and 2-2 counterbalance apparatuses 601 and 602 are connected to the third joint J3 and second ends of the 2-1 and 2-2 counterbalance apparatuses 601 and 602 are combined with the third link 13 so that a compensation torque for a tare weight of the third link 13 is generated when the third link 13 is rotated with respect to the third joint J3. The 3-1 reference surface 701 and the 3-2 reference surface 702 are disposed to be aligned with a rotational axis of the third joint J3, and rotated with respect to a rotational axis of the third joint J3. The first end of the 2-1 counterbalance apparatus 601 is connected to the 3-1 reference surface 701. The first end of the 2-2 counterbalance apparatus 602 is connected to the 3-2 reference surface 702.

The 3-1 reference surface 701 is connected to the 2-1 reference surface 201 and the 3-2 reference surface 702 is connected to the 2-2 reference surface 202. Rotational angle and direction of the 3-1 reference surface 701 is substantially same as those of the 2-1 reference surface 201 and rotational angle and direction of the 3-2 reference surface 702 is substantially same as those of the 2-2 reference surface 202.

The third link 13 is connected to the second end of the second link 12, via the third joint J3 which is the pitch direction rotational axis parallel with the ground surface, the third link 13 is rotated with respect to the rotational axis of the third joint J3, and the 2-1 counterbalance apparatus 601 and the 2-2 counterbalance apparatus 602 are equipped in parallel to connect the third link 13 to the third joint J3. Thus, the robot arm may generate the compensation torque adjustable to the tare weigh of the third link 13.

In addition, the 3-1 reference surface 701 and the 3-2 reference surface 702 are formed to be rotated with respect to the third joint J3 and to be fixed. Here, the 3-1 reference surface 701 is connected to the 2-1 reference surface 201 such that the 3-1 reference surface 701 is rotated by the angle and direction substantially same as the rotated angle of the 2-1 reference surface 201. Likewise, the 3-2 reference surface 702 is connected to the 2-2 reference surface 202 such that the 3-2 reference surface 702 is rotated by the angle and the direction substantially same as the rotated angle of the 2-2 reference surface 202.

Accordingly, when the first link 11 or the base is inclined with respect to one of or both of the pitch direction rotational axis and the yaw direction rotational axis, the angles of the second link 12 and the third link 13 are changed such that the gravity torque is changed due to the change of the tare weight of the second and third links 12 and 13. Thus, the angles of the 2-1 reference surface 201, the 2-2 reference surface 702, the 3-1 reference surface 701 and the 302 reference surface 702 are changed together, to control the compensation torque of each of the second and third links 12 and 13.

Here, the 2-1 reference surface 201 and the 3-1 reference surface 701 are connected and the 2-2 reference surface 202 and the 3-2 reference surface 702 are connected, and thus the angles of the plurality of reference surfaces may be controlled together via operating the 1-1 reference surface controller 301 and the 1-2 reference surface controller 302.

Thus, additional reference controller like a motor for controlling and fixing the angle of the 3-1 reference surface 701 and the 3-2 reference surface 702 is unnecessary.

Here, the 2-1 counterbalance apparatus 601 and the 2-2 counterbalance apparatus 602 may have the shape and the structure substantially same as those of the 1-1 counterbalance apparatus 101 and the 1-1 counterbalance apparatus 102, and thus may include a coil spring 610, a guide rod 620, a sliding block 630, a wire 640 and a roller 650.

In addition, the 3-1 reference point 711 of the 3-1 reference surface 701 and the 3-2 reference point 712 of the 3-2 reference surface 702 may be disposed upwardly along the vertical direction from the central axis of the third joint J3 which is the rotational axis.

Accordingly, in cases that the robot arm is formed with multi degrees of freedom robot arm in which the plurality of joints are used to connect, each reference surface may be controlled together according to the rotational angle of the fixing surface of the robot or the joint of the robot base, and thus the compensation torque may be properly provided to each of the joints of the robot.

In addition, as the third link 13 is connected to the second link 12 to generate the compensation torque and the reference surfaces are connected to be controlled together, additional fourth link or more links may be connected together to generate the compensation torque properly.

In addition, the 2-1 reference surface 201 and the 3-1 reference surface 701 are connected via a link member in which 4 bars are connected with a parallelogram shape, and the 2-2 reference surface 202 and the 3-2 reference surface 702 are connected via a link member in which 4 bars are connected with a parallelogram shape.

Figure 23:
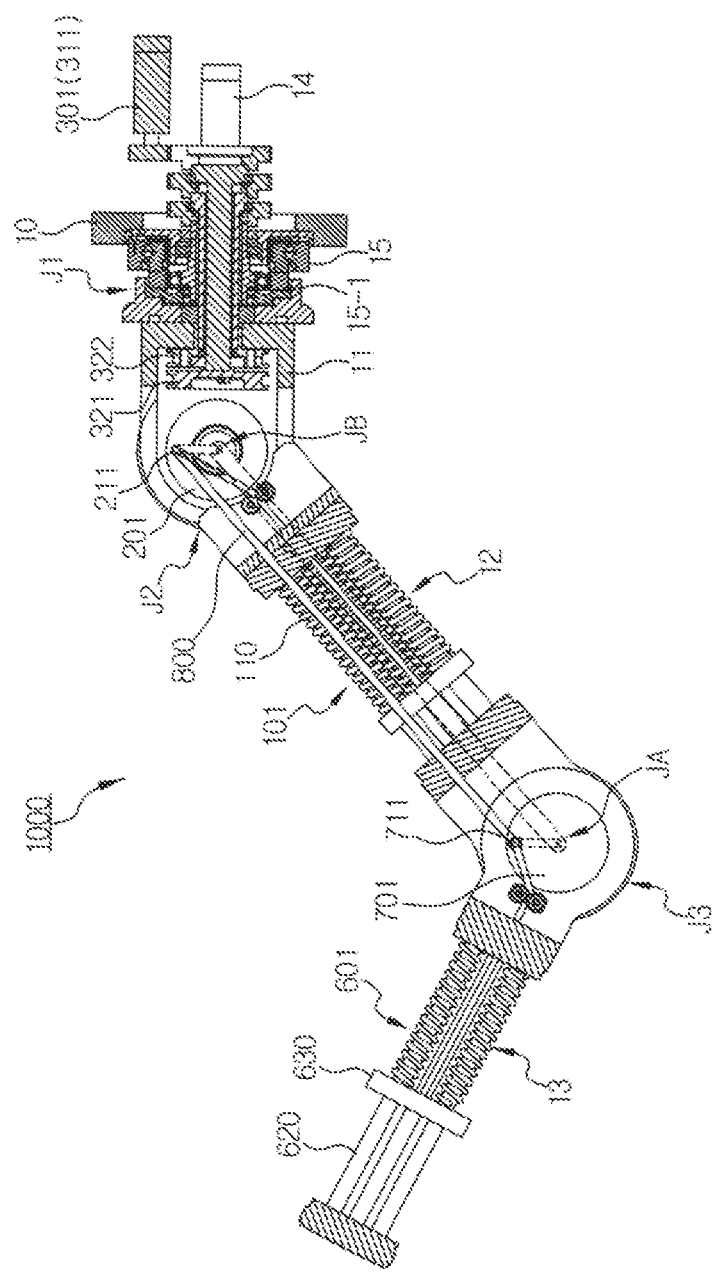
FIGS. 23 and 24 are conceptual views illustrating the apparatus of FIG. 12, in which a 1-1 counterbalance apparatus and a 2-1 counterbalance apparatus are connected by a link and a belt such that reference surfaces are connected with each other.
Figure 24:
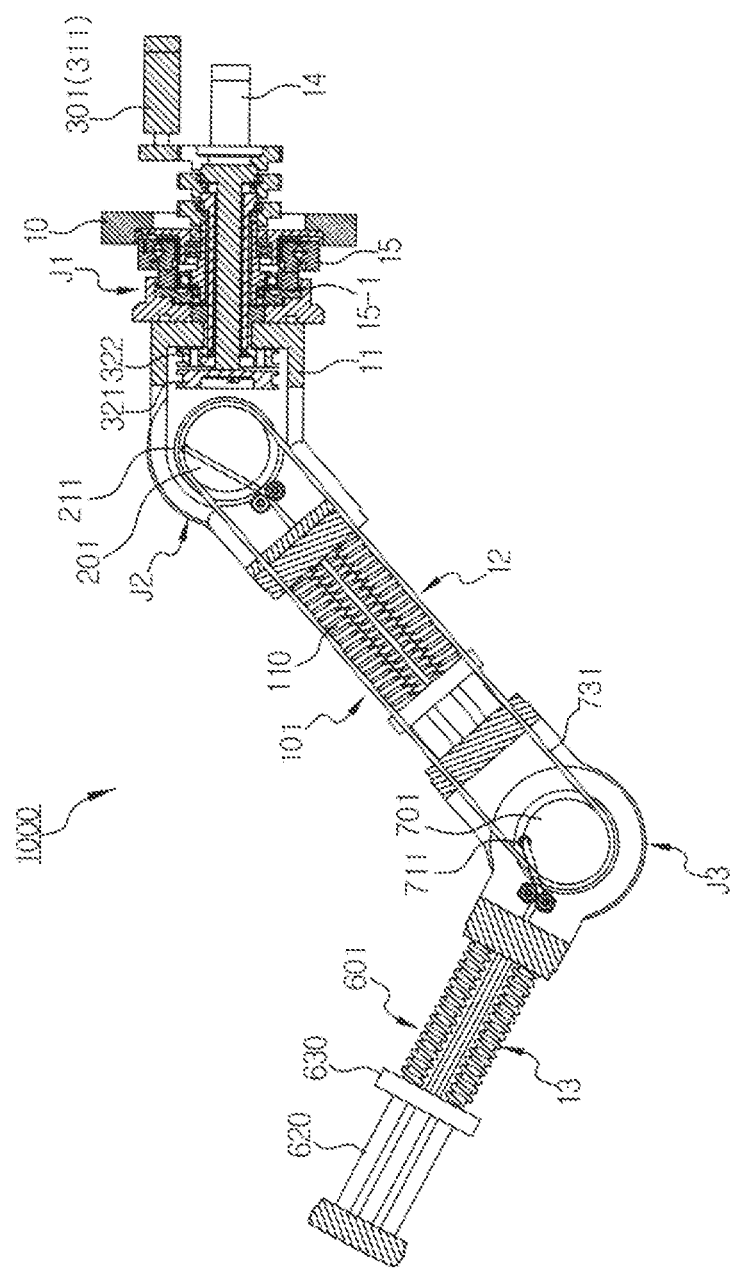

As illustrated in FIG. 23, the 2-1 reference surface 201 and the 3-1 reference surface 701 are connected by the link member 800, so that the 3-1 reference surface 701 may be rotated by the angle and the direction substantially same as the rotation of the 2-1 reference surface 201. Likewise, the 2-2 reference surface 202 and the 3-2 reference surface 702 are connected by the link member 800, so that the 3-2 reference surface 702 may be rotated by the angle and the direction substantially same as the rotation of the 2-2 reference surface 202.

For example, in cases of the 2-1 reference surface 201 and the 3-1 reference surface 701, a first joint JA of the link member 800 is to be the second joint J2 of the robot arm, a second joint JB of the link member 800 is to be the third joint J3, and the remaining two joints is to be the rotational axes of the 2-1 reference point 211 and the 3-1 reference point 711. Thus, the 2-1 reference surface 201 and the 3-1 reference surface 701 are rotated together by the same angle and direction.

Here, as for the link member 800, the second link 12 which is the robot arm is to be the first link, the 2-1 reference surface 201 is to be the second link, and the 3-1 reference surface 701 is to be the third link. Thus, the remaining single link is combined to connect the 2-1 reference point 211 to the 3-1 reference point 711, so that the link member 800 is formed to be connected with the parallelogram shape by using a single bar.

Alternatively, using the link structure connected with parallelogram shape, the 2-1 reference surface 201 and the 3-1 reference surface 701 are connected and rotated together by the same angle, with various kinds of shapes. Here, the same structures may be applied to the 2-2 reference surface 202 and the 3-2 reference surface 702.

In addition, the 2-1 reference surface 201 and the 3-1 reference surface 701 may be connected with each other by the pulley or the belt, and the 2-2 reference surface 202 and the 3-2 reference surface 702 may be connected with each other by the pulley or the belt.

Likewise, as for the 2-1 reference surface 201 and the 3-1 reference surface 701, as illustrated in FIG. 17, the 2-1 reference surface 201 and the 3-1 reference surface 702 are connected to each other by the pulley or the belt, and thus the 3-1 reference surface 701 may be rotated by the same angle and direction as the rotation of the 2-1 reference surface 201.

For example, a 2-1 pulley 221 is combined with the 2-1 reference surface 201 along the same axis, a 3-1 pulley 721 is combined with the 3-1 reference surface 701 along the same axis, and the 2-1 pulley 221 and the 3-1 pulley 721 may be connected with each other by the 3-1 belt 731 or the wire.

Here, a diameter of the 2-1 pulley 221 is substantially same as the 3-1 pulley 721, and the 3-1 belt 731 is connected to the pulley tightly without intersected or twisted.

The pulley and the belt may be the timing pulley and the timing belt to be operated correctly, or may be a sprocket and a chain. Alternatively, the 2-1 reference surface 201 and the 3-1 reference surface 701 may be rotated with the same angle and direction, via using various kinds of gears and rotational axes.

The 2-2 reference surface 202 and the 3-2 reference surface 702 may be the same structures as mentioned above. Here, the 2-1 pulley 221 may be the pulley forming the 2-1 reference surface 201, and the 2-2 pulley 222 may be the pulley forming the 2-2 reference surface 202. Likewise, the 3-1 pulley 721 may be the pulley forming the 3-1 reference surface 701, and the 3-3 pulley 722 may be the pulley forming the 3-2 reference surface.

In addition, when the first link 11 is rotated with respect to the first joint J1 with the base 10 fixed, the 1-1 reference surface 321 and the 1-2 reference surface 322 may be fixed, and the 2-1 reference surface 201 and the 2-2 reference surface 202 may be rotated oppositely with the same angle.

The base 10 is fixed, and the first link 11 is rotated with respect to the first joint J1 which is the yaw direction rotational axis. Here, the 2-1 reference surface 201 is connected to and rotated together with the 1-1 reference surface 321, and the 1-1 reference surface 321 and the 2-1 reference surface 201 may be connected by the wire, the belt, the gear and so on.

Thus, when the 1-1 reference surface 321 aligned with the first joint J1 is fixed, the 2-1 reference surface 201 is rotated with respect to the first joint J1 and is also rotated with respect to the second joint J2, together with the first link 11.

Likewise, with the 1-2 reference surface 322 fixed, the 2-2 reference surface 202 is rotated with respect to the first joint J1 and is also rotated with respect to the second join J2, together with the first link 11.

Here, the 2-1 reference surface 201 and the 2-2 reference surface 202 are rotated with the same angle as the first link 11, but the 2-1 reference surface 201 and the 2-2 reference surface 202 are rotated oppositely and are fixed, with respect to the axis direction of the second joint J2.

Thus, when the first link 11 is rotated with respect to the first joint J1, the gravity torque applied to the second link 12 is changed, and here, the 1-1 reference surface controller 301 and the 1-2 reference surface controller 302 are not operated, so that the compensation torque may be controlled adjustable to the change of the gravity torque applied to the second link 12, with the 1-1 reference surface 321 and the 1-2 reference surface 322 fixed.

When the first link 11 and the base 10 are rotated to be inclined with respect to the yaw direction rotational axis, the 1-1 reference surface controller 301 and the 1-2 reference surface controller 302 are operated corresponding to the rotational angle of the first link 11 and the base 10, so that the 1-1 reference surface 321 and the 1-2 reference surface 322 are rotated. Thus, the 2-1 reference surface 201 and the 2-2 reference surface 202 are rotated oppositely to be fixed, with respect to the axis direction of the second joint J2.

In addition, a first link rotational motor 14 and a first link rotational reduction gear 15 are combined with the base 10. The first link 11 is combined with a rotational axis 15-1 of the first link rotational reduction gear 15. The 1-2 rotational axis 332 of the 1-2 reference surface 322 is combined to pass through the rotational axis 15-1 of the first link rotational reduction gear 15. The 1-1 rotational axis 331 of the 1-1 reference surface 321 is combined to pass through the 1-2 rotational axis 332 of the 1-2 reference surface 322. Thus, the central axes of the above three rotational axes are aligned with each other.

As illustrated in the figure, the first link 11 is rotated with respect to the first joint J1 which is the yaw direction rotational axis, the first link rotational motor 14 and the first link rotational reduction gear 15 are combined with the base, and the rotational axis 15-1 of the first link rotational reduction gear 15 is combined with the first link 11 to be rotated.

In addition, the above mentioned three rotational axes are sequentially inserted to be a hollowness shape, and the rotational axes are spaced apart from each other to be easily rotated.

In addition, the first link rotational motor 14 is fixed to the base 10, a 1-1 reference surface control motor 311 is combined with the 1-1 rotational axis 331 to rotate the 1-1 rotational axis 331, and the 1-1 reference surface control motor 311 is combined with the base 10.

Likewise, the 1-2 reference surface control motor 312 is combined with the 1-2 rotational axis 332 to rotate the 1-2 rotational axis, and the 1-2 reference surface control motor 312 is combined with the base 10.

In addition, the motor may be a normal type motor, and the reduction gear having high reduction rate may be used to function as the brake.

Alternatively, the motor with the brake, the stepping motor, the servo-motor may be used to control the rotational angle of the reference surfaces more correctly.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An apparatus for an adjustable counterbalance mechanism, comprising:
   a reference surface;
   a link having a first end rotationally connected to the reference surface to form a rotational center, a weight center of the link being spaced apart from the rotational center;
   an elastic member having a first end combined with the link;
   a wire having a first side combined with a second end of the elastic member, and a second side combined with the reference surface;
   an idle roller combined with the link to support a portion between first and second ends of the wire;
   a compensation torque controller equipped to the link, to control a position of the idle roller and an elastic force of the elastic member;
   a sliding block combined with the link; and
   a lead screw combined with the sliding block at an outer side of the link,
   wherein the lead screw is disposed in parallel with the elastic member.

2. The apparatus of claim 1, wherein the elastic member is a coil spring arranged along a longitudinal direction of the link, and the elastic force is controlled according to an initial compressive distance of the coil spring.

3. The apparatus of claim 2, further comprising a spring fixed surface combined with the link to move and be fixed along the longitudinal direction of the link, the first end of the elastic member being supported by the spring fixed surface,
   wherein the idle roller is combined with the link, and moves and is fixed along the longitudinal direction of the link.

4. The apparatus of claim 3, wherein the sliding block is configured to move and is fixed along the longitudinal direction of the link,
- wherein the spring fixed surface is combined and fixed with the sliding block, and the idle roller is combined and fixed with the sliding block.

5. The apparatus of claim 4, further comprising:
- a driving motor fixed to the link and connected to the lead screw, to rotate the lead screw,
- wherein a first side or opposed axial sides of the lead screw is rotationally combined with the link, and
- wherein at least two lead screws are combined along a direction perpendicular to the longitudinal direction of the link.

6. The apparatus of claim 5, further comprising a weight measuring sensor attached to the link.

7. A method for controlling an apparatus for an adjustable counterbalance mechanism, the apparatus comprising a reference surface, a link, an elastic member, a wire, an idle roller, a compensation torque controller, a sliding block and a lead screw, the link having a first end rotationally connected to the reference surface to form a rotational center, a weight center of the link being spaced apart from the rotational center, the elastic member having a first end combined with the link, the wire having a first side combined with a second end of the elastic member and a second side combined with the reference surface, the idle roller being combined with the link to support a portion between first and second ends of the wire, the compensation torque controller being equipped to the link, to control the position of the idle roller and an elastic force of the elastic member, the sliding block being combined with the link, the lead screw being combined with the sliding block at an outer side of the link,
- in the method, as a weight applied to a second end of the link increases, an initial compressive distance of the coil spring and a distance from the rotational center to the wire increase,
- as the weight applied to the second end of the link decreases, the initial compressive distance of the coil spring and the distance from the rotational center to the wire decrease,
- wherein the lead screw is disposed in parallel with the elastic member.

8. The method of claim 7, wherein
- the elastic member is a coil spring, and
- as the weight applied to the second end of the link changes, the initial compressive distance of the coil spring and the distance from the rotational center to the wire increase or decrease by the same distance.

9. The method of claim 7, wherein the weight applied to the second end of the link is measured to control the compensation torque automatically or manually.

* * * * *